US006451121B2

(12) United States Patent
Chiu et al.

(10) Patent No.: US 6,451,121 B2
(45) Date of Patent: Sep. 17, 2002

(54) THERMALLY-INHIBITED NON-PREGELATINIZED GRANULAR STARCHES AND FLOURS AND PROCESS FOR THEIR PREPARATION

(75) Inventors: Chung-Wai Chiu, Westfield; Eleanor Schiermeyer, Bound Brook, both of NJ (US); David J. Thomas, Eagan, MN (US); Manish B. Shah, Franklin Park, NJ (US); Douglas J. Hanchett, Wharton, NJ (US); Roger Jeffcoat, Bridgewater, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/798,520

(22) Filed: Mar. 2, 2001

Related U.S. Application Data

(63) Continuation of application No. 09/327,393, filed on Jun. 7, 1999, now Pat. No. 6,231,675, which is a continuation of application No. 08/593,022, filed on Jan. 29, 1996, now Pat. No. 5,932,017, which is a continuation of application No. 08/374,279, filed on Jan. 18, 1995, now Pat. No. 5,725,676, which is a continuation-in-part of application No. 08/296,211, filed on Aug. 25, 1994, now abandoned, which is a continuation-in-part of application No. 08/099,753, filed on Jul. 30, 1993, now abandoned.

(51) Int. Cl.$^7$ .............................................. C08B 30/00
(52) U.S. Cl. ........................... 127/29; 127/32; 127/34; 127/65; 127/67; 127/69; 127/70; 127/71
(58) Field of Search .............................. 127/29, 32, 34, 127/65, 67, 69–71

(56) References Cited

U.S. PATENT DOCUMENTS

| 2,274,789 A | 3/1942 | Horesi .......................... 127/38 |
| 2,317,752 A | 4/1943 | Fuller .......................... 127/33 |
| 2,373,016 A | 4/1945 | Daly et al. ..................... 127/70 |
| 2,427,328 A | 9/1947 | Schopmeyer et al. ......... 127/32 |
| 2,590,912 A | 4/1952 | Yarber .......................... 127/32 |
| 2,661,349 A | 12/1953 | Caldwell et al. ............. 260/224 |
| 2,791,512 A | 5/1957 | Hatch et al. ................. 106/208 |
| 2,897,086 A | 7/1959 | Sowell et al. ................. 99/139 |
| 3,155,527 A | 11/1964 | Mentzer ...................... 106/210 |
| 3,331,697 A | 7/1967 | Salamon ...................... 106/213 |
| 3,399,081 A | 8/1968 | Bernetti et al. ................ 127/71 |

(List continued on next page.)

FOREIGN PATENT DOCUMENTS

| CA | 1 150 934 | 8/1992 |
| EP | 0 129 227 A1 | 12/1984 |
| EP | 0 257 338 A2 | 3/1988 |
| EP | 0 321 216 A2 | 6/1989 |
| EP | 0 415 385 A2 | 3/1991 |
| EP | 0 490 424 A1 | 6/1992 |
| GB | 263897 | 12/1926 |
| GB | 530226 | 12/1940 |
| GB | 595552 | 12/1947 |
| GB | 1479515 | 7/1977 |
| JP | 60-97331 | 5/1985 |
| JP | 61-254602 | 11/1986 |
| WO | WO 95/04082 | 2/1995 |

OTHER PUBLICATIONS

Irving Martin, Journal of Applied Polymer Science, "Crosslinking of Starch by Alkaline Roasting", vol. 11, No. 5, pp. 1283–1288 (May 1967).

J.W. Donovan et al., Cereal Chemistry, "Differential Scannign Calorimetry of Heat–Moisture Treated Wheat and Potato Starches", vol. 60, No. 5, pp. 381–387 (1983), month not available.

Rolf Stute, Starch/Stärke, "Hydrothermal Modification of Starches The Difference Between Annealing and Heat/Moisture Treatment", vol. 44, No. 6, pp. 205–214 (1992), Month Not Available.

L. Sair et al., Industrial and Engineering Chemistry, "Water Sorption by Starches", vol. 36, No. 3, pp. 18–21, date not Available.

Dong–Hyun Lee et al., Chem Eng. Technol., "Drying Characteristics of Starch in an Inert Medium Fluidized Bed", vol. 16, pp. 263–269 (1993), month not available.

"The bepex Fluid Bed" (Bulletin). No month/date available.

Cristina Ferrero et al., Journal of Food Processing and Preservation, "Stability of Frozen Starch Pastes: Effect of Freezing, Storage and Xanthan Gum Addition", vol. 17, pp. 191–211 (1993), month not Available.

Sair "Heat–Moisture Treatment of Starches", Methods in Carboyhdate Chemistry, p. 283–285, vol. IV, Starch, Academic Press (1964).

R.B. Evans and O.B. Wurburz, Chapter XI: "Production and Use of Starch Dextrins", pp. 253–278 in Starch: Chemistry and Technology, vol. II. Industrial Aspects (1967), month not avail.

Copy of PCT Search Reports for PCT/US95/00682, PCT/US95/00684, PCT/US95/00688, PCT/US94/08559, PCT/US95/09138, PCT/US96/00988, and PCT/US96/00999.

Primary Examiner—Mark L. Bell
Assistant Examiner—Patricia L. Hailey
(74) Attorney, Agent, or Firm—Laurelee A. Duncan, Esq.; Margaret B. Kelly, Esq.

(57) ABSTRACT

Thermally-inhibited starches and flours which are functionally equivalent to chemically-crosslinked starches are prepared by a process which comprises the steps of dehydrating a granular starch or flour to anhydrous or substantially anhydrous (<1% moisture) and heat treating the dehydrated starch or flour for a time and at a temperature sufficient to inhibit the starch, (e.g., 120–180° C. for up to 20 hours). Preferably the pH of the starch is adjusted to neutral or greater (e.g., pH 8–9.5) prior to the dehydration. The dehydration may be a thermal dehydration carried out simultaneously with the heat treatment or a non-thermal dehydration carried out by extraction with a solvent (e.g., ethanol) or by freeze drying.

19 Claims, No Drawings

U.S. PATENT DOCUMENTS

| | | | |
|---|---|---|---|
| 3,408,214 A | 10/1968 | Mentzer | 106/212 |
| 3,463,668 A | 8/1969 | Evans et al. | 127/32 |
| 3,477,903 A | 11/1969 | Semegran et al. | 161/266 |
| 3,490,917 A | 1/1970 | Doe et al. | 99/93 |
| 3,515,591 A | 6/1970 | Feldman et al. | 127/32 |
| 3,563,798 A | 2/1971 | Germino et al. | 127/32 |
| 3,578,497 A | 5/1971 | Hjermstad | 127/32 |
| 3,607,394 A | 9/1971 | Germino et al. | 127/32 |
| 3,607,396 A | 9/1971 | Germino et al. | 127/71 |
| 3,640,756 A | 2/1972 | Beersma et al. | 117/76 |
| 3,690,938 A | 9/1972 | Swift | 117/122 |
| 3,725,387 A | 4/1973 | McClendon et al. | 260/233.3 |
| 3,810,783 A | 5/1974 | Bomball | 117/122 |
| 3,844,807 A | 10/1974 | Bramel | 106/213 |
| 3,949,104 A | 4/1976 | Cheng et al. | 426/578 |
| 3,950,593 A | 4/1976 | Bomball | 428/476 |
| 3,967,975 A | 7/1976 | Idaszak | 127/23 |
| 3,977,897 A | 8/1976 | Wurzburg et al. | 127/71 |
| 4,013,799 A | 3/1977 | Smalligan et al. | 426/578 |
| 4,131,576 A | 12/1978 | Isherwood et al. | 260/17.3 |
| 4,256,509 A | 3/1981 | Tuschhoff et al. | 127/32 |
| 4,266,348 A | 5/1981 | Ledding | 34/10 |
| 4,280,851 A | 7/1981 | Pitchon et al. | 127/33 |
| 4,303,451 A | 12/1981 | Seidel et al. | 127/32 |
| 4,303,452 A | 12/1981 | Ohira et al. | 127/32 |
| 4,329,181 A | 5/1982 | Chiu et al. | 106/213 |
| 4,366,275 A | 12/1982 | Silano et al. | 524/47 |
| 4,391,836 A | 7/1983 | Chiu | 426/578 |
| 4,428,972 A | 1/1984 | Wurzberg et al. | 426/578 |
| 4,465,702 A | 8/1984 | Eastman et al. | 426/578 |
| 4,491,483 A | 1/1985 | Dudacek et al. | 127/33 |
| 4,575,395 A | 3/1986 | Rudin | 127/32 |
| 4,600,472 A | 7/1986 | Pitchon et al. | 159/4 B |
| 4,610,760 A | 9/1986 | Kirkpatrick et al. | 159/4.01 |
| 4,847,371 A | 7/1989 | Schara et al. | 536/111 |
| 5,037,929 A | 8/1991 | Rajagopalan et al. | 426/578 |
| 5,085,228 A | 2/1992 | Mooney et al. | 151/37 |
| 5,087,649 A | 2/1992 | Wegner et al. | 524/30 |
| 5,149,799 A | 9/1992 | Rubens | 536/102 |
| 5,155,140 A | 10/1992 | Marten et al. | 523/100 |
| 5,181,959 A | 1/1993 | Nagai et al. | 106/211 |
| 5,329,004 A | 7/1994 | Eden et al. | 536/109 |
| 5,368,690 A | 11/1994 | Solarek et al. | 162/175 |
| 5,718,770 A * | 2/1998 | Shah et al. | 127/65 |
| 5,720,822 A * | 2/1998 | Jeffcoat et al. | 127/67 |
| 5,725,676 A * | 3/1998 | Chiu et al. | 127/34 |
| 5,846,786 A * | 12/1998 | Senkeleski et al. | 127/65 |
| 5,932,017 A * | 8/1999 | Chiu et al. | 127/67 |
| 6,010,574 A1 * | 1/2001 | Jeffcoat et al. | 127/65 |
| 6,221,420 B1 * | 4/2001 | Thomas et al. | 426/578 |
| 6,231,675 B1 * | 5/2001 | Chiu et al. | 127/67 |

* cited by examiner

THERMALLY-INHIBITED NON-PREGELATINIZED GRANULAR STARCHES AND FLOURS AND PROCESS FOR THEIR PREPARATION

This application is a continuation of U.S. application Ser. No. 09/327,393 filed Jun. 7, 1999, now U.S. Pat. No. 6,231,675, which is a continuation of U.S. application Ser. No. 08/593,022 filed Jan. 29, 1996, now U.S. Pat. No. 5,932,017 issued Aug. 3, 1999, which is a continuation of U.S. application Ser. No. 08/374,279 filed Jan. 18, 1995, now U.S. Pat. No. 5,725,676 issued Mar. 10, 1998, which is a continuation-in-part of U.S. application Ser. No. 08/296,211 filed Aug. 25, 1994, now abandoned, which is a continuation-in-part of U.S. application Ser. No. 08/099,753 filed Jul. 30, 1993, now abandoned.

FIELD OF THE INVENTION

This invention relates to starches and flours that are inhibited and to a process for their preparation. The inhibited starches and flours may be used in place of the chemically crosslinked (i.e., chemically inhibited) starches and flours presently used in foods and in the manufacture of industrial products.

BACKGROUND OF THE INVENTION

Heat Treatment of Starches and Flours

Heat/moisture treatment and annealing of starches and/or flours are taught in the literature and distinguished by the amount of water present. "Annealing" involves slurrying a granular starch with excess water at temperatures below the starch's or flour's gelatinization temperature. "Heat/moisture-treatment" involves a semi-dry treatment at temperatures below the starch's or flour's gelatinization temperature, with no added moisture and with the only moisture present being that normally present in a starch granule (which is typically 10% or more).

In the following discussion, a history of the various heat/moisture and annealing treatments of starch and/or flour is set out.

GB 263,897 (accepted Dec. 24, 1926) discloses an improvement in the heat treatment process of GB 228,829. The process of the '829 patent involves dry heating flour or wheat to a point at which substantially all of the gluten is rendered non-retainable in a washing test and then blending the treated flour or wheat with untreated flour or wheat to provide a blend having superior strength. The improvement of the '897 patent is continuing the dry heating, without, however, gelatinizing the starch, for a considerable time beyond that necessary to render all of the gluten non-retainable. "Dry-heating" excludes heating in a steam atmosphere or an atmosphere containing considerable quantities of water vapor which would tend to gelatinize the starch. The wheat or flour may contain the usual amount of moisture, preferably not greater than 15%. The heat treatment may exceed 7 hours at 77–93° C. (170–200 ° F.), e.g., 8 to 14 hours at 82° C. (180° F.) or 6 hours at 100° C. (212° F.).

GB 530,226 (accepted Dec. 6, 1940) discloses a method for drying a starch cake containing about 40–50% water with hot air or another gas at 149° C. (300° F.) or above without gelatinizing the starch. The starch cake is disintegrated by milling it to a finely divided state prior to drying.

GB-595,552 (accepted Dec. 9, 1947) discloses treatment of starch, more particularly a corn starch, which involves drying the starch to a relatively low moisture content of 1–2%, not exceeding 3%, and subsequently dry heating the substantially moisture-free starch at 115–126° C. for 1 to 3 hours. The treatment is intended to render the starch free from thermophilic bacteria. The starch should not be heated longer than necessary to effect the desired sterilization.

U.S. Pat. No. 3,490,917 (issued Jan. 20, 1970 to C.A.F. Doe et al.) discloses a process for preparing a non-chlorinated cake flour suitable for use in cakes and sponges having a high sugar to flour ratio. The starch or a flour in which the gluten is substantially or completely detached from the starch granules is heated to a temperature of from 100–140° C. and then cooled. The conditions are selected so that dextrinization does not occur, e.g., about 15 minutes at 100–115° C. and no hold and rapid cooling at the higher temperatures. The heat treatment should be carried out under conditions which allow the water vapor to escape. The reduction in moisture content due to the heat treatment depends upon the temperature employed. At treatment temperatures of 100–105° C., the moisture content is reduced from 10–12% to 8–9%, by weight, while at medium and high temperatures the moisture content is typically reduced to 7% or less. Preferably, during cooling the moisture is allowed to reach moisture equilibrium with the atmosphere. The gelatinization temperature of the heat treated starch or flour is approximately 0.5–1° C. higher than that of a comparable chlorinated flour or starch. The heating can be carried out in many ways, including heating in a hot air fluidized bed.

U.S. Pat. No. 3,578,497 (issued May 11, 1971 to E. T. Hjermstad) discloses a process for non-chemically improving the paste and gel properties of potato starch and imparting a swelling temperature as much as −7 to −1° C. (to 20 to 30° F.) higher. A concentrated suspension (20–40% dry solids) at a neutral pH (5.5–8.0, preferably 6–7.5) is heated either for a long time at a relatively low temperature or for a short time at successively higher temperatures. The suspension is first heated at a temperature below the incipient swelling temperature of the particular batch of starch being treated (preferably 49° C.–120° F.). Then the temperature is gradually raised until a temperature well above the original swelling temperature is attained. It is essential that swelling be avoided during the different heating periods so that gelatinization does not occur. After this steeping treatment the starch has a higher degree of granular stability. It resists rapid gelatinization and produces a rising or fairly flat viscosity curve on cooling. The pastes are very short textured, non-gumming, non-slimy, cloudy and non-cohesive. They form firm gels on cooling and aging.

U.S. Pat. No. 3,977,897 (issued Aug. 31, 1976 to Wurzburg et al.) discloses a method for preparing non-chemically inhibited amylose-containing starches. Both cereal and root starches can be inhibited, but the inhibition effects are more observable with root starches. Amylose-free starches, such as waxy corn starch, show no or very slight inhibition. The Brabender viscosity of cooked pastes derived from the treated starch was used to determine the inhibition level. Inhibition was indicated by a delayed peak time in the case of the treated corn starch, by the lack of a peak and a higher final viscosity in the case of the treated achira starch, and by the loss of cohesiveness in the case of the treated tapioca starch. The granular starch is suspended in water in the presence of salts which raise the starch's gelatinization temperature so that the suspension may be heated to high temperatures without causing the starch granules to swell and rupture yielding a gelatinized product. The preferred salts are sodium, ammonium, magnesium or potassium sulfate; sodium, potassium or ammonium chloride; and sodium, potassium or ammonium phosphate. About 10–60 parts of salt are used per 100 parts by weight of starch. Preferably, about 110 to 220 parts of water are used per 100 parts by weight of starch. The suspension is heated at 50–100° C., preferably 60–90° C., for about 0.5 to 30 hours. The pH of the suspension is maintained at about 3–9, preferably 4–7. Highly alkaline systems, i.e., pH levels above 9 retard inhibition.

U.S. Pat. No. 4,013,799 (issued Mar. 22, 1977, to Smalligan et al.) discloses heating a tapioca starch above its gelatinization temperature with insufficient moisture (15 to 35% by total weight) to produce gelatinization. The starch is heated to 70–130° C. for 1 to 72 hours. The starch is used as a thickener in wet, pre-cooked baby foods having a pH below about 4.5.

U.S. Pat. No. 4,303,451 (issued Dec. 1, 1981 Seidel et al.) discloses a method for preparing a pregelatinized waxy maize starch having improved flavor characteristics reminiscent of a tapioca starch. The starch is heat treated at 120–200° C. for 15 to 20 minutes. The pregelatinized starch has gel strength and viscosity characteristics suitable for use in pudding mixes.

U.S. Pat. No. 4,303,452 (issued Dec. 1, 1981 Ohira et al.) discloses smoking a waxy maize starch to improve gel strength and impart a smoky taste. In order to counteract the smoke's acidity and to obtain a final product with a pH of 4–7, the pH of the starch is raised to pH 9–11 before smoking. The preferred water content of the starch during smoking is 10–20%.

The article "Differential Scanning Calorimetry of Heat-Moisture Treated Wheat and Potato Starches" by J. W. Donovan et al. in *Cereal Chemistry,* Vol. 60, No. 5, pp. 381–387 (1983) discloses that the gelatinization temperature of the starches increased as a result of the heat/moisture treatment or annealing. See also the article "A DSC Study Of The Effect Annealing On Gelatinization Behavior Of Corn Starch" by B. R. Krueger et al. in Journal of Food Science, Vol. 52, No. 3, pp. 715–718 (1987).

U.S. Pat. No. 4,391,836 (issued Jul. 5, 1983 C.-W. Chiu) discloses instant gelling tapioca and potato starches which are non-granular and which have a reduced viscosity. Unmodified potato and tapioca starches do not normally gel. The starches of the patent are rendered non-granular and cold-water-dispersible by forming an aqueous slurry of the native starch at a pH of about 5–12 and then drum-drying the slurry. The starches are rendered gelling by heat treating the drum-dried starch for about 1.5 to 24 hours at 125–180° C. to reduce the viscosity to within defined Brabender viscosity limitations.

U.S. Pat. No. 4,491,483 (issued Jan. 1, 1985 W. E. Dudacek et al.) discloses subjecting a semi-moist blend of a granular starch with at least 0.25 wt. % of a fatty acid surfactant and sufficient water (about 10–40 wt. %) to a heat-moisture treatment at from about 50–120° C., followed by drying to about 5–15 wt. %, preferably 10 wt. %, moisture. The heat-moisture treated starch-surfactant product is characterized by a hot water dispersibility of from about 60–100% and a higher pasting temperature than the granular starch from which it is derived. Preferably, the treatment takes place in a closed container so that the moisture can be maintained at a constant level. The preferred conditions are 3 to 16 hours at 60–90° C. Degradation and dextrinization reactions are undesirable as they destroy the thickening ability of the starch. The use of conditions, such as, e.g., 35 moisture at 90° C. for 16 hours results in reduced paste viscosity. It is believed the presence of the surfactant during the treatment permits formation of a complex within the partially swollen starch matrix with straight chain portions of the starch molecules. The limited moisture environment allows complex formation without gelatinization.

Japanese Patent Publication No. 61-254602, (published Dec. 11, 1987) discloses a wet and dry method for heating waxy corn starch and derivatives thereof to impart emulsification properties. The wet or dry starch is heated at 100–200° C., preferably 130–150° C., for 0.5 to 6 hours. In the dry method, the water content is 10%, preferably 5%, or less. In the wet method, the water content is 5 to 50%, preferably 20–30%. The pH is 3.5–8, preferably 4–5.

The article "Hydrothermal Modification of Starches: The Difference between Annealing and Heat/Moisture-Treatment", by Rolf Stute, Starch/Stärke Vol. 44, No. 6, pp. 205–214 (1992) reports almost identical modifications in the properties of potato starch with annealing and heat/moisture treatments even through the alteration of the granular structure is different. The Brabender curves of the heat/moisture-treated and annealed potato starches show the same typical changes, including a higher gelatinization temperature and a lower peak viscosity or no peak. The DSC curves also show a shift to higher gelatinization temperatures for both treatments. A combined treatment involving annealing a heat/moisture-treated potato starch leads to a further increase in gelatinization temperature without detectable changes in gelatinization enthalpy and with retention of the viscosity changes caused by the heat treatment. A combined treatment involving annealing a heat/moisture-treated potato starch does not lower the gelatinization temperature, when compared to the base starch, and increases the gelatinization temperature at higher heat/moisture treatment levels.

Chemical Crosslinking of Starches and Flours

Starches are chemically modified with difunctional reagents, such as phosphorus oxychloride, sodium trimetaphosphate, adipic anhydride, acetic anhydride and epichlorohydrin, to produce chemically crosslinked starches having excellent tolerance to processing variables such as heat, shear, and pH extremes. Such chemically crosslinked (also referred to as "inhibited") starches provide a desirable smooth texture and possess viscosity stability throughout the processing operation and normal shelf life.

In contrast, unmodified (i.e., non-crosslinked) starches breakdown in viscosity, loose thickening capacity and textural qualities, and behave unpredictably during storage as a result of the stresses encountered during processing. Heat, shear, and/or an extreme pH, especially an acidic pH, tend to fully disrupt the starch granules and disperse the starch.

When native starch granules are dispersed in water and heated, they become hydrated and swell at about 60° C., and reach a peak viscosity through the 65°–95° C. range. This increase in viscosity is a desired property in many food and industrial applications and results from the physical force or friction between the highly swollen granules. Swollen, hydrated starch granules, however, are quite fragile. As the starch slurry is held at temperatures of 92°–95° C., the starch granules begin to fragment and the viscosity breaks down. Shear or conditions of extreme pH also tend to disrupt and fragment the granules, so that the starch polymers dissociate and become solubilized, leading to a rapid breakdown from the initially high viscosity.

It has been known that both the swelling of the starch granules and the breakdown in viscosity can be inhibited by treating the starch with chemical reagents that introduce intermolecular bridges or crosslinks between the starch molecules. The crosslinks reinforce the associative hydrogen bonds holding the granules together, restrict the swelling of the starch granules, and consequently inhibit disruption and fragmentation of the granules. Because of this inhibition, crosslinked starches are also called inhibited starches.

Because chemically crosslinked starches are used in many applications where a stable-viscosity starch paste is needed, it would be an advantage in cost, time, and in the reduction of the use of chemicals, if native or modified starch could be inhibited to perform the same as chemically crosslinked starch without the use of chemicals.

SUMMARY OF THE INVENTION

Non-pregelatinized starches and flours are thermally inhibited, without the addition of chemical reagents, in a heat treatment process that results in the starch or flour becoming and remaining inhibited. The starches and flours are referred to as "inhibited" or "thermally-inhibited (abbreviated "T-I"). When these thermally-inhibited starches and flours are dispersed and/or cooked in water, they exhibit the textural and viscosity properties characteristic of a chemically-crosslinked starch. The starch granules are more resistant to viscosity breakdown. This resistance to breakdown results in what is subjectively considered a non-cohesive or "short" textured paste, meaning that the gelatinized starch or flour tends to be salve-like and heavy in viscosity rather than runny or gummy.

The non-pregelatinized thermally-inhibited granular starches and flours exhibit an unchanged or reduced gelatinization temperature. In contrast, most annealed and heat/moisture treated starches show an increased gelatinization temperature. Chemically-crosslinked starches show an unchanged gelatinization temperature. It is believed the overall granular structure of the thermally-inhibited starches and flours has been altered.

The starches and flours that are substantially completely thermally inhibited will resist gelatinization. The starches and flours that are highly inhibited will gelatinize to a limited extent and show a continuing rise in viscosity but will not attain a peak viscosity. The starches and flours that are moderately inhibited will exhibit a lower peak viscosity and a lower percentage breakdown in viscosity compared to the same starch that is not inhibited. The starches and flours that are lightly inhibited will show a slight increase in peak viscosity and a lower percentage breakdown in viscosity compared to the same starch that is not inhibited.

The starches and flours are inhibited by a process which comprises the steps of dehydrating the starch or flour until it is anhydrous or substantially anhydrous and then heat treating the anhydrous or substantially anhydrous starch or flour at a temperature and for a period of time sufficient to inhibit the starch or flour. As used herein, "substantially anhydrous" means containing less than 1% moisture by weight. The dehydration may be a thermal dehydration or a non-thermal dehydration such as alcohol extraction or freeze drying. An optional, but preferred, step is adjusting the pH of the starch or flour to neutral or greater prior to the dehydration step.

Depending on the extent of the heat treatment, various levels of inhibition can be achieved. For example, lightly inhibited, higher viscosity products with little breakdown, as well as highly inhibited, low viscosity products with no breakdown, can be prepared by the thermal inhibition processes described herein.

DESCRIPTION OF THE PREFERRED EMBODIMENTS

All starches and flours are suitable for use herein. The thermally-inhibited starches and flours can be derived from any native source. A "native" starch or flour is one as it is found in nature in unmodified form. Typical sources for the starches and flours are cereals, tubers, roots, legumes and fruits. The native source can be corn, pea, potato, sweet potato, banana, barley, wheat, rice, sago, amaranth, tapioca, sorghum, waxy maize, waxy pea, waxy wheat, waxy tapioca, waxy rice, waxy barley, waxy potato, waxy sorghum, starches having an amylose content of 40% or greater and the like. Preferred starches the are waxy starches, potato, tapioca and corn (including waxy maize, waxy tapioca, waxy rice, waxy potato, waxy sorghum, and waxy barley.

The thermal inhibition process may be carried out prior to or after other starch or flour reactions used to modify starch or flour. The starches may be modified by conversion (i.e., acid-, enzyme-, and/or heat-conversion), oxidation, phosphorylation, etherification (e.g., by reaction with propylene oxide), esterification (e.g., by reaction with acetic anhydride or octenylsuccinic anhydride), and/or chemical crosslinking (e.g., by reaction with phosphorus oxychloride or sodium trimetaphosphate). The flours may be modified by bleaching or enzyme conversion. Procedures for modifying starches are described in the Chapter "Starch and Its Modification" by M. W. Rutenberg, pages 22–26 to 22–47, Handbook of Water Soluble Gums and Resins, R. L. Davidson, Editor (McGraw-Hill, Inc., New York, N.Y. 1980).

Native granular starches have a natural pH of about 5.0–6.5. When such starches are heated to temperatures above about 125° C. in the presence of water, acid hydrolysis (i.e., degradation) of the starch occurs. This degradation impedes or prevents inhibition. Therefore, the dehydration conditions need to be chosen so that degradation is avoided. Suitable conditions are dehydrating at low temperatures and the starch's natural pH or dehydrating at higher temperatures after increasing the pH of the starch to neutral or above. As used herein, "neutral" covers the range of pH values around pH 7 and is meant to include from about pH 6.5–7.5. A pH of at least 7 is preferred. More preferably, the pH is 7.5–10.5. The most preferred pH range is above 8 to below 10. At a pH above 12, gelatinization more easily occurs. Therefore, pH adjustments below 12 are more effective. It should be noted that the textural and viscosity benefits of the thermal inhibition process tend to be enhanced as the pH is increased, although higher pHs tend to increase browning of the starch or flour during the heat treating step.

To adjust the pH, the non-pregelatinized granular starch or flour is typically slurried in water or another aqueous medium, in a ratio of 1.5 to 2.0 parts of water to 1.0 part of starch or flour, and the pH is raised by the addition of any suitable base. Buffers, such as sodium phosphate, may be used to maintain the pH if needed. Alternatively, a solution of a base may be sprayed onto the powdered starch or flour until the starch or flour attains the desired pH, or an alkaline gas such as ammonia can be infused into the starch or flour. After the pH adjustment, the slurry is then either dewatered and dried, or dried directly, typically to a 2–15% moisture content. These drying procedures are to be distinguished from the thermal inhibition process steps in which the starch or flour is dehydrated to anhydrous or substantially anhydrous and then heat treated.

Suitable bases for use in the pH adjustment step include, but are not limited to, sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, and any other bases approved for use under the applicable regulatory laws. The preferred base is sodium carbonate. It may be possible to use bases not approved provided they can be washed from the starch or flour so that the final product conforms to good manufacturing practices for the desired end use.

A thermal dehydration is carried out by heating the starch or flour in a heating device for a time and at a temperature sufficient to reduce the moisture content to less than 1%, preferably 0%. Preferably, the temperatures used are 125° C. or less, more preferably 100–120° C. The dehydrating temperature can be lower than 100° C., but a temperature of at least 100° C. will be more efficient for removing moisture.

Representative processes for carrying out a non-thermal dehydration include freeze drying or extracting the water from the starch or flour using a solvent, preferably a hydrophilic solvent, more preferably a hydrophilic solvent which forms an azeotropic mixture with water (e.g., ethanol).

For a laboratory scale dehydration with a solvent, the starch or flour (about 4–5% moisture) is placed in a Soxhlet thimble which is then placed in a Soxhlet apparatus. A suitable solvent is placed in the apparatus, heated to its reflux temperature, and refluxed for a time sufficient to dehydrate the starch or flour. Since during the refluxing the solvent is condensed onto the starch or flour, the starch or flour is exposed to a lower temperature than the solvent's boiling point. For example, during ethanol extraction the temperature of the starch is only about 40–50° C. even though ethanol's boiling point is about 78° C. When ethanol is used as the solvent, the refluxing is continued for about 17 hours. The extracted starch or flour is removed from the thimble, spread out on a tray, and the excess solvent is allowed to flash off. The time required for ethanol to flash off is about 20–30 minutes. The dehydrated starch or flour is immediately placed in a suitable heating apparatus for the heat treatment. For a commercial scale dehydration any continuous extraction apparatus is suitable.

For dehydration by freeze drying, the starch or flour (4–5% moisture) is placed on a tray and put into a freeze dryer. A suitable bulk tray freeze dryer is available from FTS Systems of Stone Ridge, N.Y. under the trademark Dura-Tap. The freeze dryer is run through a programmed cycle to remove the moisture. The temperature is held constant at about 20° C. and a vacuum is drawn to about 50 milliTorr (mT). The starch or flour is removed from the freeze dryer and immediately placed into a suitable heating apparatus for the heat treatment.

After it is dehydrated, the starch or flour is heat treated for a time and at a temperature sufficient to inhibit the starch or flour. The preferred heating temperatures are greater than about 100° C. For practical purposes, the upper limit of the heat treating temperature is about 200° C. Typical temperatures are 120–180° C., preferably 140–160° C., most preferably 160° C. The temperature selected will depend upon the amount of inhibition desired and the rate at which it is to be achieved.

The time at the final heating temperature will depend upon the level of inhibition desired. When a conventional oven is used, the time ranges from 1 to 20 hours, typically 2 to 5 hours, usually 3.5 to 4.5 hours. When a fluidized bed is used, the times range from 0 minutes to 20 hours, typically 0.5 to 3.0 hours. Longer times are required at lower temperatures to obtain more inhibited starches.

For most applications, the thermal dehydrating and heat treating steps will be continuous and accomplished by the application of heat to the starch or flour beginning from ambient temperature. The moisture will be driven off during the heating and the starch will become anhydrous or substantially anhydrous. Usually, at these initial levels of inhibition, the peak viscosities are higher than the peak viscosities of starches heated for longer times, although there will be greater breakdown in viscosity from the peak viscosity. With continued heat treating, the peak viscosities are lower, but the viscosity breakdowns are less.

The process may be carried out as part of a continuous process involving the extraction of the starch from a plant material.

As will be seen in the following examples, the source of the starch or flour, the initial pH, the dehydrating conditions, the heating time and temperature, and the equipment used are all interrelated variables that affect the amount of inhibition.

The heating steps may be performed at normal pressures, under vacuum or under pressure, and may be accomplished by conventional means known in the art. The preferred method is by the application of dry heat in dry air or in an inert gaseous environment.

The heat treating step can be carried out in the same apparatus in which the thermal dehydration occurs. Most conveniently the process is continuous with the thermal dehydration and heat treating occurring in the same apparatus, as when a fluidized bed is used.

The dehydrating and heat treating apparatus can be any industrial ovens, conventional ovens, microwave ovens, dextrinizers, dryers, mixers and blenders equipped with heating devices and other types of heaters, provided that the apparatus is fitted with a vent to the atmosphere so that moisture does not accumulate and precipitate onto the starch or flour. The preferred apparatus is a fluidized bed. Preferably, the apparatus is equipped with a means for removing water vapor, such as, a vacuum or a blower to sweep air or the fluidizing gas from the head-space of the fluidized bed. Suitable fluidizing gases are air and nitrogen. For safety reasons, it is preferable to use a gas containing less than 12% oxygen.

Superior inhibited starches having high viscosities with low percentage breakdown in viscosity are obtained in shorter times in the fluidized bed than can be achieved using other conventional heating ovens or dryers.

The starches or flours may be inhibited individually or more than one may be inhibited at the same time. They may be inhibited in the presence of other materials or ingredients that would not interfere with the thermal inhibition process or alter the properties of the starch or flour product.

Sample Preparation

Unless indicated otherwise, all the starches and flours used were granular and were provided by National Starch and Chemical Company of Bridgewater N.J.

The controls were from the same native source as the test samples, were unmodified or modified in the same manner as the test sample, and were at the same pH, unless otherwise indicated. All starches and flours, both test and control samples, were prepared and tested individually.

The pH of the starch samples was raised by slurrying the starch or flour in water at 30–40% solids and adding a sufficient amount of a 5% sodium carbonate solution until the desired pH was reached. All samples were spray dried or flash dried, as conventional in the art (without gelatinization) to about 2–15% moisture, except for the non-thermally dehydrated starches which were generally oven dried (without gelatinization) to about 2–6% moisture.

Measurements of pH, either on samples before or after the thermal inhibition steps, were made on samples consisting of one part starch or flour to four parts water.

Except where a conventional oven or dextrinizer is specified, the test samples were dehydrated and heat treated in a fluidized bed reactor, model number FDR-100, manufactured by Procedyne Corporation of New Brunswick, N.J. The cross-sectional area of the fluidized bed reactor was 0.05 sq meter. The starting bed height was 0.3 to 0.8 meter, but usually 0.77 meter. The fluidizing gas was air, except where otherwise indicated, and the air was used at a velocity of 5–15 meter/min. The sidewalls of the reactor were heated with hot oil, and the fluidizing gas was heated with an electric heater. The samples were loaded to the reactor and then the fluidizing gas was introduced, or the samples were loaded while the fluidizing gas was being introduced. No difference was noted in the samples depending on the order of loading. Unless otherwise specified, the samples were brought from ambient temperature up to no more than 125° C. until the samples became anhydrous and were further heated to the specified heat treating temperature. When the heat treating temperature was 160° C., the time to reach that temperature was less than three hours.

The moisture level of the samples at the final heating temperature was 0%, except where otherwise stated. Portions of the samples were removed and tested for inhibition at the temperatures and times indicated in the tables.

Unless specified otherwise, the samples were tested for inhibition using the following Brabender Procedures.

Brabender Procedure

All samples, except for corn, tapioca and waxy rice flour, were slurried in a sufficient amount of distilled water to give a 5% anhydrous solids starch slurry. Corn, tapioca, and waxy rice flour were slurried at 6.3% anhydrous solids. The pH was adjusted to pH 3.0 with a sodium citrate/citric acid buffer. The slurry was introduced into the sample cup of a Brabender VISCO\Amylo\GRAPH fitted with a 350 cm/gram cartridge. The starch slurry was heated rapidly to 92° C. and held for 10 minutes.

The peak viscosity and viscosity ten minutes (10') after peak viscosity were recorded in Brabender Units (BU). The percentage breakdown (±2%) in viscosity was calculated according to the formula:

$$\% \text{ Breakdown} = \frac{\text{peak} - (\text{peak} + 10')}{\text{peak}} \times 100$$

where "peak" is the peak viscosity in Brabender Units, and "(peak+10')" is the viscosity in Brabender Units at ten minutes after peak viscosity.

If no peak viscosity was reached, that is, the data indicate a rising curve or a flat curve, the viscosity at 92° C. and the viscosity at 30 minutes after attaining 92° C. were recorded.

Using data from Brabender curves, inhibition was determined to be present if, when dispersed at 5–6.3% solids in water at 92°–95° C. and pH 3 during the Brabender heating cycle, the Brabender data showed (i) no or almost no viscosity, indicating the starch was so inhibited it did not gelatinize or strongly resisted gelatinization; (ii) a continuous rising viscosity with no peak viscosity, indicating the starch was highly inhibited and gelatinized to a limited extent; (iii) a lower peak viscosity and a lower percentage breakdown in viscosity from peak viscosity compared to a control, indicating a moderate level of inhibition; or (iv) a slight increase in peak viscosity and a lower percentage breakdown compared to a control, indicating a low level of inhibition.

Characterization of Inhibition by Brabender Data

Characterization of a thermally inhibited starch is made more conclusively by reference to a measurement of its viscosity after it is dispersed in water and gelatinized. The instrument used to measure the viscosity is a Brabender VISCO\Amylo\GRAPH, (manufactured by C.W. Brabender Instruments, Inc., Hackensack, N.J.). The VISCO\Amylo\GRAPH records the torque required to balance the viscosity that develops when a starch slurry is subjected to a programmed heating cycle. For non-inhibited starches, the cycle passes through the initiation of viscosity, usually at about 60°–70° C., the development of a peak viscosity in the range of 65°–95° C., and any breakdown in viscosity when the starch is held at the elevated temperature, usually 92°–95° C. The record consists of a curve tracing the viscosity through the heating cycle in arbitrary units of measurement termed Brabender Units (BU).

Inhibited starches will show a Brabender curve different from the curve of the same starch that has not been inhibited (hereinafter the control starch). At low levels of inhibition, an inhibited starch will attain a peak viscosity somewhat higher than the peak viscosity of the control, and there may be no decrease in percentage breakdown in viscosity compared to the control. As the amount of inhibition increases, the peak viscosity and the breakdown in viscosity decrease. At high levels of inhibition, the rate of gelatinization and swelling of the granules decreases, the peak viscosity disappears, and with prolonged cooking the Brabender trace becomes a rising curve indicating a slow continuing increase in viscosity. At very high levels of inhibition, starch granules no longer gelatinize, and the Brabender curve remains flat.

Characterization of Inhibition by Texture

Starches or flours with a low to moderate degree of inhibition will exhibit certain textural characteristics when dispersed in an aqueous medium and heated to gelatinization. In the following examples, the starches or flours were determined to be inhibited if a heated gelatinized slurry of the starch or flour exhibited a non-cohesive, smooth texture.

Brabender Procedure—Crosslinked Starches

The crosslinked, thermally-inhibited cationic and amphoteric starches (23.0 g) to be tested were combined with 30 ml of an aqueous solution of citric acid monohydrate (prepared by diluting 210.2 g of citric acid monohydrate to 1000 ml in a volumetric flask) and sufficient water was added to make the total charge weight 460.0 g. The slurry is added to the cooking chamber of the Brabender VISCO amylo GRAPH fitted with a 700 cm/gram cartridge and rapidly heated from room temperature to 95° C. The peak viscosity (highest viscosity observed) and the viscosity after 30 minutes at 95° C. were recorded. The percentage breakdown in viscosity (±2%) was calculated according to the formula $$\% \text{ Breakdown} = \frac{\text{Peak} - (\text{Viscosity after 30}' \text{ at } 95°C.)}{\text{Peak}} \times 100$$

Brookfield Viscometer Procedure

Test samples are measured using a Model RVT Brookfield Viscometer and the appropriate spindle (the spindle is selected based on the anticipated viscosity of the material). The test sample, usually a cooked starch paste, is placed in position and the spindle is lowered into the sample to the appropriate height. The viscometer is turned on and the spindle is rotated at a constant speed (e.g., 10 or 20 RPM) for at least 3 revolutions before a reading is taken. Using the appropriate conversion factors, the viscosity (in centipoises) of the sample is recorded.

Angle of Repose Determination

This test measure the flow properties of the starch or flour. A large sheet of heavy Kraft paper (about 6 ft. square) is secured to a flat, level surface with masking tape. Two rings (3 in. and 4 in. in diameter) are clamped onto a ring stand (6×9 in. base and 24 in. rod) in such a way that the base faces in the opposite direction from the rings. The small ring is placed above the larger ring. To keep the funnels stationary, 1 in. pieces of heavy walled vacuum tubing (¼ in. base by 3/16 in. wall) are cut lengthwise through one wall and fitted equidistantly at 3 locations on each ring. A chemical funnel having a 100 mm top interior diameter (ID) (Kimax 58) is modified by removing the existing stem and annealing a 8 mm I.D. glass tubing 85 mm in length as the stem. The modified funnel is placed in the large ring and the height is adjusted so that the orifice of the funnel is 1±0.1 cm above the paper. A powder funnel having a 60 mm top I.D. and 13 mm stem I.D. (Kimax 29020-04) is placed in the small ring and the ring is lowered as far as possible, i.e., until the clamps meet. The small funnel should be centered above the large funnel with the orifice of the large funnel stem parallel to the paper. Approximately 50 g of the sample to be tested are slowly added to the powder funnel while gently placing the top of an index finger over the orifice of the large funnel so that any sample which overflows the powder funnel does not flow out of the large funnel. The finger is slowly removed from the orifice while taking care not to move the funnel and allow the sample to flow onto the paper. Flow will cease when the top of the pile reaches the orifice of the funnel stem. With a pencil, the circumference of the sample pile is traced as accurately as possible without disturbing the sample. The sample is removed and the radius of the pile is measured. Each sample is run in triplicate. The test is repeated if the funnel stem becomes clogged before the pile meets the funnel orifice or if the pile is disturbed in any way. The funnels are cleaned after each run.

The average radius of the sample pile is calculated and the angle of repose is determined using the following formula:

$$\text{Tangent (angle of repose)} = \frac{\text{height of funnel orifice}}{\text{average radius of pile}}$$

Horiba Wet Particle Size Determination

For determination of the Horiba wet particle size determination, the thermally-inhibited starches were analyzed, according to the instruction manual-version 1.81C, of the Horiba, Model #LA-900, Laser Scattering Particle Size Distribution Analyzer (Horiba Instrument Inc., Irvine, Calif. 92174). This determination requires that the sample be added under agitation to a cup which contains distilled or de-ionized water until a desired concentration is achieved. The software package then automatically initiates the analysis.

Characterization of Inhibition by Cooks

A dry blend of 7 g of starch or flour (anhydrous basis) and 14 g of sugar were added to 91 ml of water in a Waring blender cup at low speed, then transferred to a cook-up beaker, allowed to stand for 10 minutes, and then evaluated for viscosity, color, clarity and texture.

Some of the granular non-pregelatinized starch samples were tested for pasting temperature and/or gelatinization temperature using the following procedures.

Rapid Visco Analyzer (RVA)

This test is used to determine the onset of gelatinization, i.e., the pasting temperature. The onset of gelatinization is indicated by an increase in the viscosity of the starch slurry as the starch granules begin to swell.

A 5 g starch sample (anhydrous basis) is placed in the analysis cup of a Model RVA-4 Analyzer and slurried in water at 20% solids. The total charge is 25 g. The cup is placed into the analyzer, rotated at 160 rpm, and heated from an initial temperature of 50° C. up to a final temperature of 800C at a rate of 3° C./minute. A plot is generated showing time, temperature, and viscosity in centipoises (cP). The pasting temperature is the temperature at which the viscosity reaches 500 cP. Both pasting temperature and pasting time are recorded.

Differential Scanning Calorimetry (DSC)

This test provides a quantitative measurement of the enthalpy ($\Delta H$) of the energy transformation that occurs during the gelatinization of the starch granule. The peak temperature and time required for gelatinization are recorded. A Perkin-Elmer DSC-4 differential scanning calorimeter with data station and large volume high pressure sample cells is used. The cells are prepared by weighing accurately 10 mg of starch (dry basis) and the appropriate amount of distilled water to approximately equal 40 mg of total water weight (moisture of starch and distilled water). The cells are then sealed and allowed to equilibrate overnight at 4° C. before being scanned at from 25–150° C. at the rate of 10° C./minute. An empty cell is used as the blank.

Brookfield Viscometer Procedure

Test samples are measured using a Model RVT Brookfield Viscometer and the appropriate spindle (the spindle is selected based on the anticipated viscosity of the material). The test sample, usually a cooked starch paste, is placed in position and the spindle is lowered into the sample to the appropriate height. The viscometer is turned on and the spindle is rotated at a constant speed (e.g., 10 or 20 rpm) for at least 3 revolutions before a reading is taken. Using the appropriate conversion factors, the viscosity (in centipoises) of the sample is recorded.

EXAMPLES

The following examples will more fully illustrate the embodiments of the invention. In the examples, all parts are given by weight and temperature are in degrees Celsius unless otherwise noted. The thermally-inhibited starches and controls in the following examples were prepared as described above and are defined by textural characteristics or in relation to data taken from Brabender curves using the above described procedures. The thermally-inhibited starches and flours are referred to as "T-I" starches and flours and the conditions used for their preparation (i.e., pH to which the starch is adjusted and heat treatment temperature and time at that temperature are included in parenthesis—(pH; temperature/hold time at that temperature). All pH adjustments are done with sodium carbonate unless specified otherwise. Unless otherwise specified, the thermally-inhibited starches and flours referred to as "granular" starches are non-pregelatinized granular starches and flours.

In the first three examples, the moisture indicated is the moisture of the starch before the dehydration and heat treating steps. As indicated above, as the starches were brought from ambient temperature up to the heating temperature, the starches became anhydrous or substantially anhydrous.

In the tables the abbreviations "sl.", "mod.", "v.", "ris." and "N.D." stand for slight or slightly, moderate or moderately, very, rising, and not determined.

Example 1

This example illustrates the preparation of the starches of this invention from a commercial granular waxy maize base starch by the heat treatment process of this invention.

Processing conditions and their effects on viscosity and texture of waxy maize starch are set forth in the Tables below.

To obtain a heat-stable, non-cohesive thickener, samples of granular starch were slurried in 1.5 parts of water, the pH of the slurry was adjusted with the addition of a 5% $Na_2CO_3$ solution and the slurry was agitated for 1 hour, then filtered, dried, and ground. The dry starch samples (150 g) were placed into an aluminum foil pan (4"×5"×1½") and heated in a conventional oven under the conditions described in Tables I and II. Brabender viscosity measurements demonstrated that the most heat-stable starches were obtained by heating at 160° C. and a pH of at least 8.0 for about 3.5 to 6.0 hours.

| | | Process Variables | | | |
|---|---|---|---|---|---|
| | | Heating - 160° C. | | | |
| Waxy Maize[a] | pH | Moisture (%) | Time (hrs.) | Cold Evaluation of Gelatinized Samples[d,e] | |
| | | | | Viscosity | Texture |
| 1 | 6.0 | 10.9 | 2 | heavy to v. heavy | cohesive |
| 2 | 6.0 | 10.9 | 4 | thin to mod. | — |
| 3 | 8.2 | 10.6 | 3.5 | heavy to v. heavy | cohesive, less than unmodified control |
| 4 | 8.2 | 10.6 | 4 | heavy to v. heavy | sl. to mod. cohesive |
| 5 | 8.2 | 10.6 | 4.5 | heavy | non-cohesive |
| 6 | 8.2 | 10.6 | 5.5 | heavy, thinnest | non-cohesive |
| 7 | 8.2 | 10.6 | 6 | mod. heavy | non-cohesive |
| unmodified[b] | — | — | — | v. heavy | cohesive |
| crosslinked[c] | — | — | — | v. heavy | non-cohesive |

[a]All samples were commercial samples of granular waxy maize starch obtained from National Starch and Chemical Company, Bridgewater, New Jersey.
[b]The unmodified control was a commercial granular waxy maize starch obtained from National Starch and Chemical Company, Bridgewater, New Jersey.
[c]The modified control was a commercial crosslinked (phosphorus oxychloride treated) granular waxy maize starch obtained from National Starch and Chemical Company, Bridgewater, New Jersey.
[d]Samples were cooked by slurrying 7.0 g of starch (at 12% moisture) in 91 mls water at neutral pHs and heating the starch slurry for 20 minutes in a boiling water bath.
[e]The cold evaluation was carried out at 25° C.

| | | Brabender Evaluation | | | |
|---|---|---|---|---|---|
| | | Process Variables | | Brabender Viscosity[b] (BU) | |
| Waxy Maize[a] | pH | Heating Temp. (° C.) | Time (hrs.) | Peak Viscosity | Viscosity at 95° C./ 20 mins. |
| 3 | 8.2 | 160 | 3.5 | 985 | 830 |
| 4 | 8.2 | 160 | 4.0 | 805 | 685 |
| 5 | 8.2 | 160 | 4.5 | 640 | 635 |
| 6 | 8.2 | 160 | 5.5 | 575 | 570 |
| Unmodified control | — | none | none | 1640 | 630 |
| 1 | 6.0 | 160 | 2.0 | 1055 | 560 |
| 2 | 6.0 | 160 | 4.0 | 140 | 80 |

[a]See Table I for a description of samples.
[b]In the Brabender procedure, a sample containing 5.4% anhydrous solids of starch dispersed in water was heated rapidly to 50° C., then the heat was increased by 1.5° C. per minute to 95° C., and held for 20 minutes.

Example 2

This example illustrates that a variety of granular starches may be processed by the method of this invention to provide a non-cohesive thickener with properties similar to chemically crosslinked starches.

Processing conditions and their effects on the viscosity and texture of waxy barley, tapioca, V.O. hybrid and waxy rice starches are set forth in the tables below.

| Sample[a] | pH | Process Variables Heating - 160° C. Moisture (%) | Time (hrs.) | Cold Evaluation of Gelatinized Sample[b] Viscosity/Texture | |
|---|---|---|---|---|---|
| Waxy Barley Starch | | | | | |
| 1 | 8.7 | 8.5 | 1.5 | heavy | cohesive |
| 2 | 8.7 | 8.5 | 2.5 | heavy | sl. mod. cohesive |
| 3 | 8.7 | 8.5 | 3.5 | mod. heavy to heavy | non-cohesive |
| 4 | 5.2 | 10.8 | 1.5 | thin | — |
| 5 | 5.2 | 10.8 | 2.5 | thin/thinnest | — |
| Waxy Barley Control | — | — | 0 | heavy | cohesive |
| Tapioca Starch | | | | | |
| 6 | 8.8 | 10.3 | 2 | heavy to v. heavy | cohesive |
| 7 | 8.8 | 10.3 | 3 | heavy to v. heavy | cohesive/less than Sample 6 |
| 8 | 8.8 | 10.3 | 4 | heavy to v. heavy | sl. cohesive to sl. lumpy |
| 9 | 8.8 | 10.3 | 5 | heavy | non-cohesive lumpy |
| 10 | 5.5 | 10.9 | 3 | mod. heavy | — |
| Tapioca Control | — | — | 0 | v. heavy | cohesive |
| Waxy Rice Starch | | | | | |
| 1 | 9.1 | 9.0 | 2 | v. heavy | cohesive |
| 2 | 9.1 | 9.0 | 3 | heavy | sl. cohesive |
| 3 | 9.1 | 9.0 | 4 | heavy | sl. cohesive |
| 4 | 9.1 | 9.0 | 5 | mod. heavy to heavy | non-cohesive |
| Waxy Rice Control | — | — | 0 | v. heavy | cohesive |

[a]Tapioca starch samples were commercial granular starch obtained from National Starch and Chemical Company, Bridgewater, New Jersey. Waxy barley starch samples were commercial granular starch obtained from AlKo, Finland. Waxy rice starch samples were commercial granular starch obtained from Mitsubishi Corporation, Japan.
[b]Samples were cooked by slurrying 7.5 g of starch at 12% moisture in 100 mls of water and heating the starch slurry for 20 minutes in a boiling water bath.

| Sample[a] | pH | Process Variables Heating - 160° C. Moisture (%) | Time (hrs.) | Cold Evaluation of Gelatinized Sample[b] Viscosity/Texture | |
|---|---|---|---|---|---|
| V.O. Hybrid Starch | | | | | |
| 1 | 8.7 | 10.5 | 2.0 | heavy | cohesive v. sl. less than control |
| 2 | 8.7 | 10.5 | 3.0 | heavy | sl. mod. cohesive |
| 3 | 8.7 | 10.5 | 4.0 | mod. heavy to heavy | smooth, very sl. cohesive |
| 4 | 8.7 | 10.5 | 5.0 | mod. heavy | smooth, short, non-cohesive |
| 5 | 8.7 | 10.5 | 6.0 | moderate | smooth, short, non-cohesive |
| V.O. Hybrid Control | 5.9 | 11.4 | 0 | heavy | cohesive |

[a]V.O. hybrid starch samples were granular starches obtained from National Starch and Chemical Company, Bridgewater, New Jersey.
[b]Samples were cooked by slurrying 7.5 g of starch at 12% moisture in 100 mls of water and heating the starch slurry for 20 minutes in a boiling water bath.

The viscosity and texture evaluation results show that a non-cohesive, heat-stable starch thickener may be prepared from waxy barley, V.O. hybrid, tapioca and waxy rice starches by the process of this invention. The amount of inhibition (non-cohesive, thickening character in cooked aqueous dispersion) increased with increasing time of heat treatment.

Example 3

This example illustrates the effects of temperature, the pH, and starch moisture content on the viscosity and texture of the treated starch.

Part A

A waxy maize starch sample (100 g) containing 20.4% moisture was heated in an oven at 100° C. for 16 hours in a sealed glass jar. A second sample was heated for 4 hours and a third sample was heated for 7 hours under the same conditions. The product viscosity and texture were compared to a 12.1% moisture granular waxy maize starch control using the cook evaluation method of Example 1, Table I. Results are shown in Table V, below.

| Waxy Maize[a] | Effect of Process Moisture Process Variables[b] Heat Time (hrs.) | Cold Evaluation of Gelatinized Starch[c] Viscosity | Texture |
|---|---|---|---|
| 1. Test (20.4% H$_2$O) | 16 | heavy, sl. thinner than control | cohesive |
| 2. Control (12.1% H$_2$O) | 0 | heavy | cohesive |
| 3. Test (20.4% H$_2$O) | 4 | heavy | cohesive |
| 4. Control (12.1% H$_2$O) | 0 | heavy | cohesive |

-continued

Effect of Process Moisture

| Waxy Maize[a] | Process Variables[b] Heat Time (hrs.) | Cold Evaluation of Gelatinized Starch[c] | |
|---|---|---|---|
| | | Viscosity | Texture |
| 5. Test (20.4% $H_2O$) | 7 | heavy | cohesive |
| 6. Control (12.1% $H_2O$) | 0 | heavy | cohesive |

[a]Samples were obtained from National Starch and Chemical Company, Bridgewater, New Jersey.
[b]Process was conducted at pH 5.2.
[c]See Table III for cook conditions.

The results demonstrate that moisture added during the process yields a product which is as cohesive and undesirable as a control starch which had not been heated.

Part B

Samples (900 g) of a commercial granular waxy maize starch (obtained from National Starch and Chemical Company, Bridgewater, N.J.) were placed in a 10"×15"×0.75" aluminum tray and heated in an oven at 180° C. for 15, 30, 45 and 60 minutes. The pH of the starch was not adjusted and remained at about 5.2 during the heating process. Sample viscosity and texture were evaluated by the method of Example 1.

As shown in the following table, the pH 5.2 samples were characterized by an undesirable, cohesive texture similar to that of a waxy maize starch control which had not been heat treated.

Effect of Acidic Process pH

| Sample | Process Variables[a] Heating Time (minutes) | Cold Evaluation of Gelatinized Starch[b] | |
|---|---|---|---|
| | | Viscosity | Texture |
| 1 | 15 | v. heavy | cohesive |
| 2 | 30 | v. heavy | cohesive |
| 3 | 45 | v. heavy | cohesive |
| 4 | 60 | heavy to v. heavy | cohesive |
| Control | 0 | v. heavy | cohesive |

[a]The pH was not adjusted from that of the native waxy maize starch (a pH = 5.2) and Samples 1–4 correspond to starch treated by the process of U.S. Pat. No. 4,303,451 (no pH adjustment).
[b]See Table III for cook conditions.

Thus, a combination of selected factors, including the pH, moisture content and the type of native starch, determine whether a desirable, non-cohesive, heat-stable starch thickener is produced by the process of this invention.

Example 4

This example shows carrying out the thermal inhibition in the fluidized bed previously described. The effects of temperature and time at the indicated temperature on the level of inhibition of waxy maize granular starch at pH 9.5 are shown below.

| | Viscosity (B.U.) | | |
|---|---|---|---|
| Heating Temperature and Time | Peak | Peak + 10' | Breakdown (%) |
| Control (none) | 1135 | 730 | 64.3 |
| 110° C. for 22 hrs. | 1185 | 970 | 18.1 |
| 160° C. for 0 hr. | 1055 | 880 | 16.6 |
| 160° C. for 2 hrs. | 665 | 660 | 0.7 |
| 175° C. for 0 hr. | 850 | 755 | 11.2 |
| 180° C. for 0 hr. | 715 | 680 | 4.9 |
| 190° C. for 0 hr. | 555 | 550 | 0.9 |
| 200° C. for 0 hr. | ris. | — | — |
| 200° C. for 2 hrs. | none | — | — |

The data shows that inhibited anhydrous or substantially anhydrous samples can be obtained at heat treating temperatures between 100–200° C., with more inhibition obtained at higher temperatures or at longer times at lower temperatures. The starch samples heated at 200° C. were highly inhibited (rising curves) or completely inhibited (no gelatinization).

Example 5

Samples of tapioca starch, waxy maize starch, and waxy rice flour at pH 9.4 to 9.6 were dehydrated to less than 1% moisture at a temperature below 125° C., equilibrated to 160° C. in a thermal reactor (a horizontal double ribbon jacketed vessel). The heat treating time for the samples ranged from three to six hours.

The samples were evaluated for inhibition according to the previously described Brabender procedure and the results are given in the following table.

| Starch at (pH 9.4–9.6) | | Viscosity (BU) | | |
|---|---|---|---|---|
| | | Peak | Peak + 10' | Breakdown (%) |
| Tapioca | Control | 1300 | 385 | 70.4 |
| | T-I | 340 | 295 | 13.2 |
| Waxy Maize | Control | 1135 | 405 | 64.3 |
| | T-I | 580 | 560 | 3.5 |
| Waxy Rice Flour | Control | 1140 | 307 | 73.1 |
| | T-I | 600 | 590 | 1.7 |

The dehydrated and heated starches and flour inhibited a viscosity inhibited from breakdown relative to the controls that were not dehydrated and heated. This inhibition correlated to a short, noncohesive texture in the cooled product.

Example 6

The effects of initial pH and heat treating time on the level of inhibition on samples of waxy maize starch at naturally occurring pH (about 6.0) and at pH 7.5, pH 8.5 and pH 9.5 were evaluated and the data set out in the following table.

Maize Heat Treated at 160° C. Effects of Initial pH and Heating Time

| Initial pH | Heating Time (min) | Viscosity (BU) Peak Viscosity (BU) | Peak at 10' (BU) | Breakdown (%) |
|---|---|---|---|---|
| 6.0 | control | 1135 | 405 | 64.3 |
| 6.0 | 0 | 1058 | 463 | 56.4 |
| | 30 | 710 | 460 | 35.2 |
| | 60 | 645 | 445 | 31 |
| | 90 | 570 | 440 | 22.8 |
| | 120 | 560 | 440 | 21.4 |
| | 150 | 485 | 395 | 18.6 |
| 7.3 | 90 | 645 | 500 | 22.5 |
| | 120 | 580 | 450 | 22.4 |
| | 150 | 572 | 445 | 22.2 |
| | 180 | 522 | 427 | 18.1 |
| 8.5 | 0 | 980 | 630 | 35.7 |
| | 30 | 770 | 655 | 14.9 |
| | 60 | 665 | 615 | 6.0 |
| | 90 | 625 | 600 | 4.0 |
| | 120 | 585 | 580 | 0.9 |
| 9.5 | 0 | 1055 | 880 | 16.6 |
| | 30 | 825 | 800 | 3.0 |
| | 60 | 705 | 700 | 0.7 |
| | 90 | 690 | 690 | 0 |
| | 120 | 665 | 660 | 0.7 |

The data show that starches with varying levels of inhibition, as reflected by the variance in percentage breakdown in viscosity, can be obtained at different heating times and initial pHs, and that a higher degree of inhibition can be obtained at the higher pH values and at longer heating times. Moreover, comparing the shortened heat treating times in this Example, in which the fluidized bed reactor was used, with the heat treating times in hours in Examples 4 and 5, it can be seen that inhibited starches with higher peak viscosities can be obtained at much shorter times using the fluidized bed than are possible with standard thermal reactors or ovens.

Example 7

The effects of temperature and time on the level of inhibition of waxy maize starch at pH 9.5 were evaluated. The results are set forth in the following table.

| | | Effects of Heating Temperature and Time | | |
|---|---|---|---|---|
| Heating Temp. | Time At Heating Temp. (hrs) | Viscosity (BU) Peak | Peak + 10' | Breakdown (%) |
| Control | — | 1135 | 730 | 64.3 |
| 110° C. | 22 | 1185 | 970 | 18.1 |
| 160° C. | 0 | 1055 | 880 | 16.6 |
| 160° C. | 2 | 665 | 660 | 0.7 |
| 175° C. | 0 | 850 | 755 | 11.2 |
| 180° C. | 0 | 715 | 680 | 4.9 |
| 190° C. | 0 | 555 | 550 | 0.9 |
| 200° C. | 0 | ris. | — | — |
| 200° C. | 2 | none | — | — |

The data show that inhibited starches can be obtained at heat treating temperatures between 100°–200° C., with more inhibition obtained at higher temperatures or at longer times with lower temperatures. The starch samples heated at 200° C. were highly inhibited (rising curves) or completely inhibited (no gelatinization).

Example 8

Waxy maize starch at initial pH of 9.5 was evaluated for inhibition in the presence of between 1–2% moisture by weight of the sample by injecting saturated air into the chambers of the fluidized bed reactor.

The results are set out in the following tables.

| Waxy Maize (pH 9.5; 0% Moisture) | | | | | |
|---|---|---|---|---|---|
| | | Viscosity (BU) | | | |
| | | Peak | Peak + 10' | 92+ C. | 92° C. + 30' | Breakdown (%) |
| Control | | 1140 | 410 | | | 64 |
| Temp (° C.) | Time (min) | | | | | |
| 140 | 0 | 1260 | 500 | — | — | 60 |
| 150 | 0 | 1160 | 540 | — | — | 45 |
| 155 | 0 | 1100 | 720 | — | — | 35 |
| 160 | 0 | 1080 | 840 | — | — | 22 |
| 160 | 0 | 930 | 825 | — | — | 11 |
| 160 | 15 | 760 | 740 | — | — | 3 |
| 160 | 30 | 700 | 690 | — | — | 1 |
| 160 | 45 | 695 | 690 | — | — | 1 |
| 160 | 60 | — | — | 490 | 690 | ris. |
| 160 | 90 | 605 | 590 | 414 | 590 | ris. |
| 160 | 120 | — | — | 320 | 580 | ris. |
| 160 | 150 | — | — | 200 | 480 | ris. |

* Rising viscosity.

| Waxy Maize (pH 9.5; 1–2% Moisture) | | | | | |
|---|---|---|---|---|---|
| | | Viscosity (BU) | | | |
| | | Peak | Peak + 10' | 92+ C. | 92° C. + 30' | Breakdown (%) |
| Control | | 1140 | 410 | | | 64 |
| Temp (° C.) | Time (min) | | | | | |
| 155 | 0 | 1215 | 465 | — | — | 62 |
| 160 | 0 | 1090 | 530 | — | — | 51 |
| 160 | 15 | 985 | 740 | — | — | 25 |
| 160 | 30 | 885 | 700 | — | — | 21 |
| 160 | 45 | 750 | 530 | — | — | 29 |
| 160 | 60 | 700 | 480 | — | — | 31 |
| 160 | 90 | 685 | 505 | — | — | 26 |
| 160 | 120 | 610 | 450 | — | — | 26 |
| 160 | 150 | 580 | 430 | — | — | 26 |
| 160 | 180 | 530 | 400 | — | — | 25 |

The results show that more inhibition can be obtained when the starch is heat treated at anhydrous or substantially anhydrous condition than if heat treated in the presence of moisture (note the lower percentage in viscosity breakdown for the anhydrous samples).

Example 9

Waxy maize samples at an initial moisture content of 10.9 were introduced to a fluidized bed reactor with a nitrogen fluidizing gas containing ammonia in the concentrations specified in the tables. The samples were evaluated for the effect of the ammonia gas on the level of inhibition.

| Waxy Maize | Viscosity (BU) | | Breakdown | Final |
|---|---|---|---|---|
| (0.1% NH$_3$ in N$_2$) | Peak | Peak + 10' | (%) | pH |
| Control Temp (° C.) | 1040 | 200 | 81 | — |
| Time (min) | | | | |
| 160  0 | 965 | 450 | 53 | 8.7 |
| 160  60 | 625 | 420 | 33 | 8.6 |
| 160  120 | 440 | 325 | 26 | 8.9 |
| 160  180 | 340 | 290 | 15 | 8.8 |
| 160  240 | 300 | 250 | 17 | 8.4 |

Comparing the results to those obtained in Example 6 at pH 9.5, it can be seen that ammonia gas is effective to raise the pH of the starch and prevent hydrolysis, but is not as effective as direct pH adjustment of the starch in preventing hydrolysis and promoting inhibition.

| Waxy Maize | Viscosity (BU) | | Breakdown | Final |
|---|---|---|---|---|
| (1% NH$_3$ in N$_2$) | Peak | Peak + 10' | (%) | pH |
| Control Temp (° C.) | 1040 | 200 | 81 | — |
| Time (min) | | | | |
| 160  0 | 1100 | 460 | 58 | 8.9 |
| 160  60 | 670 | 470 | 30 | 8.8 |
| 160  120 | 505 | 405 | 20 | 8.9 |
| 160  180 | 410 | 345 | 16 | 8.9 |
| 160  210 | 380 | 320 | 16 | 9.8 |

| Waxy Maize | Viscosity (BU) | | Breakdown | Final |
|---|---|---|---|---|
| (10% NH$_3$ in N$_2$) | Peak | Peak + 10' | (%) | pH |
| Control Temp (° C.) | 1040 | 200 | 81 | — |
| Time (min) | | | | |
| 160  0 | 1020 | 390 | 62 | 9.7 |
| 160  60 | 730 | 410 | 44 | 9.6 |
| 160  120 | 540 | 360 | 33 | 9.6 |
| 160  180 | 415 | 310 | 25 | 10.2 |
| 160  240 | 330 | 270 | 18 | 10.4 |

Example 10

Waxy maize samples were introduced to a fluidized bed reactor and sprayed with a 25% solution of sodium carbonate, while the fluidizing gas was being introduced, in order to raise the pH. The samples were then brought from ambient temperature to 160° C. in less than three hours, and held at 160° C. for the times specified in the table.

The samples were evaluated for inhibition. The data show that this technique is successful for raising the pH of the samples in order to prevent acid hydrolysis and promote inhibition.

| Waxy Maize | Viscosity (BU) | | Breakdown | Final |
|---|---|---|---|---|
| (with Na$_2$CO$_3$) | Peak | Peak + 10' | (%) | pH |
| Control Temp (° C.) | 1040 | 200 | 81 | — |
| Time (min) | | | | |
| 160  0 | 1000 | 500 | 50 | 9.4 |
| 160  30 | 750 | 530 | 29 | 9.2 |
| 160  60 | 645 | 500 | 22 | 9.1 |
| 160  180 | 465 | 400 | 14 | 9 |

Example 11

The effect of the fluidizing gas on the level of inhibition was evaluated on waxy maize samples at pH 9.5 fluidized with nitrogen gas and with air. The samples were tested for inhibition and the data show that a higher rate of inhibition is attained when air is used as a fluidizing gas compared to nitrogen.

| Waxy Maize (pH 9.5) | | Nitrogen | | | Air | | |
|---|---|---|---|---|---|---|---|
| | | Viscosity (BU) | | Break- | Viscosity (BU) | | Break- |
| Temp. | Time (min) | Peak | Peak + 10' | down (%) | Peak | Peak + 10' | down (%) |
| 160 | 0 | 1055 | 880 | 16.6 | 1055 | 880 | 16.6 |
| 160 | 30 | 1150 | 920 | 20.0 | 825 | 800 | 3.0 |
| 160 | 60 | 985 | 870 | 11.7 | 705 | 700 | 0.7 |
| 160 | 90 | 875 | 810 | 7.4 | 690 | 690 | 0 |
| 160 | 120 | 865 | 815 | 5.9 | 665 | 660 | 0.7 |
| 160 | 180 | 820 | 755 | 7.9 | 630 | 620 | 1.6 |

Example 12

The effects of initial pH and heat treating times at 160° C. on the level of inhibition on samples of corn starch at its naturally occurring pH, and at an initial pH 9.5, were evaluated.

The results set out in the following tables.

| Corn (natural pH) | Viscosity (BU) | | | | Breakdown |
|---|---|---|---|---|---|
| | Peak | Peak + 10' | 92° C. | 92° C. + 30' | (%) |
| Control Temp (160° C.) Time (min) | 640 | 420 | | | 34 |
| 0 | 560 | 370 | — | — | 34 |
| 30 | 510 | 330 | — | — | 35 |
| 60 | 500 | 400 | — | — | 20 |
| 90 | 450 | 360 | — | — | 20 |
| 120 | 410 | 335 | — | — | 18 |

| Corn (pH 9.5) | Viscosity (BU) | | | | Breakdown (%) |
|---|---|---|---|---|---|
| | Peak | Peak + 10' | 92° C. | 92° C. + 30' | |
| Control Temp (160° C.) Time (min) | 660 | 550 | | | 17 |
| 0 | 990 | 900 | — | — | 9 |
| 30 | 940 | 910 | — | — | 3 |
| 60 | — | — | 20 | 910 | ris. |
| 90 | — | — | 20 | 690 | ris. |
| 120 | — | — | 20 | 510 | ris. |

The data show that very high levels of inhibition can be obtained at basic pH (note increasing viscosity) compared to natural pH, and that more inhibition is obtained with longer heat-treating times.

Example 13

The effect of initial pH on the level of inhibition on samples of potato starch at naturally occurring pH and at initial pH 9.5 was evaluated.

The results set out in the following tables.

| Potato (natural pH) | Viscosity (BU) | | | | Breakdown (%) |
|---|---|---|---|---|---|
| | Peak | Peak + 10' | 92° C. | 92° C. + 30' | |
| Control Temp (° C.) | 785 | 310 | | | 61 |
| Time (min) | | | | | |
| 125  0 | 560 | 360 | — | — | 36 |
| 160  0 | 240 | 140 | — | — | 42 |
| 160  90 | 22 | 15 | — | — | 32 |
| 160  180 | 20 | 18 | — | — | 10 |

| Potato (pH 9.5) | Viscosity (BU) | | | | Breakdown (%) |
|---|---|---|---|---|---|
| | Peak | Peak + 10' | 92° C. | 92° C. + 30' | |
| Control Temp (160° C.) Time (min) | 690 | 390 | | | 43 |
| 0 | 640 | 480 | — | — | 25 |
| 30 | 940 | 795 | — | — | 15 |
| 60 | 1020 | 900 | — | — | 12 |
| 90 | 995 | 945 | — | — | 5 |
| 120 | — | — | 800 | 980 | ris. |
| 150 | — | — | 650 | 870 | ris. |
| 180 | — | — | 350 | 680 | ris. |

The Brabender data at naturally occurring pH indicate that starch degradation, rather than inhibition, occurred as heat treating progressed. This example illustrates that thermal inhibition can be a function of both pH and the starting starch. In this case, thermal inhibition of potato starch appears to be more dependent on pH compared to other starches (for example, waxy maize). Therefore, the conditions required for dehydration and successful thermal inhibition of potato starch are more strict in order to avoid hydrolysis and degradation.

Dehydration and heat treating in the basic pH range, however, provided inhibited starches that maintained high viscosities, and at heat treating times over 90 minutes, provided highly inhibited starches as indicated by a continuous increasing viscosity.

Example 14

Samples of a high amylose containing starch (Hylon V) at natural pH and pH 9.5 were evaluated for the effect of high amylose content on inhibition.

Due to the high levels of amylose, it was necessary to use a pressurized Visco/amylo/Graph (C. W. Brabender, Hackensack, N.J.) to obtain Brabender curves. Samples were slurried at 10% starch solids, heated to 120° C. and held for 30 minutes.

| High Amylose Corn | | | | | | |
|---|---|---|---|---|---|---|
| | natural pH Viscosity (BU) | | | pH 9.5 Viscosity (BU) | | |
| | peak | peak + 10' | Breakdown (%) | peak | peak + 10' | Breakdown (%) |
| Control 160° C. Time (min) | 1180 | 525 | 55.5 | 1180 | 525 | 55.5 |
| 0 | 700 | 235 | 66 | | | |
| 120 | 282 | 25 | 91 | 290 | 225 | 22 |

The data show that inhibition was obtained only on the high pH sample.

Example 15

This example shows that a granular starch can be dehydrated by ethanol extraction and that a better tasting starch is obtained.

A granular waxy maize starch was slurried in 1.5 parts water based on the weight of the starch and adjusted to pH 7 and 9.5 with 5% sodium carbonate, held for 30 minutes, filtered, and dried on a tray to a moisture content of about 5–6% moisture. The starch having the pH of 5.3 was a native starch which was not pH adjusted.

For the dehydration, the dried pH 5.3, pH 7.0, and pH 9.5 starches were each separated into two samples. One sample was dried on trays in a forced draft oven at 80° C. overnight to thermally dehydrate the starch to <1% (0%) moisture. The other sample was placed in a Soxhlet extractor and allowed to reflux overnight (about 17 hours) with anhydrous ethanol (boiling point 78.32° C.). The ethanol-extracted sample was placed on paper so that the excess alcohol could flash off which took about 30 minutes. The ethanol-extracted starch was a free flowing powder which was dry to the touch.

For the heat treatment, the oven-dehydrated starches and ethanol-extracted starches were placed on trays in a forced draft oven and heated for 3, 5, and 7 hours at 160° C.

The thermally-inhibited (T-I) starches and the controls were evaluated using the Brabender Procedure previously described was used. The results are shown below:

Brabender Results

| | Dehydration Method | Heat Treatment (160° C.) | Viscosity (BU) Peak | Peak + 10' | Breakdown (%) |
|---|---|---|---|---|---|
| Waxy Maize (pH 5.3) | | | | | |
| Control | — | — | 1245 | 330 | 74 |
| Dehydrated | oven | — | 1290 | 350 | 73 |
| Dehydrated | ethanol | — | 1205 | 245 | 80 |
| T-I | oven | 5 hrs. | 95 | 45 | 53 |
| T-I | ethanol | 5 hrs. | 255 | 185 | 28 |
| T-I | oven | 7 hrs. | 60 | 35 | 42 |
| T-I | ethanol | 7 hrs. | 165 | 105 | 36 |
| Waxy Maize (pH 7.0) | | | | | |
| Dehydrated | oven | — | 1240 | 380 | 69 |
| T-I | oven | 7 hrs. | 298 | 240 | 20 |
| T-I | ethanol | 7 hrs. | 400 | 310 | 23 |
| Waxy Maize (pH 9.5) | | | | | |
| Dehydrated | oven | — | 1250 | 400 | 68 |
| Dehydrated | ethanol | — | 1070 | 350 | 67 |
| T-I | ethanol | 3 hrs. | 665 | 635 | 5 |
| T-I | oven | 3 hrs. | 680 | 655 | 4 |
| T-I | oven | 5 hrs. | 245 | 460 | ris. |
| T-I | ethanol | 5 hrs. | 160 | 375 | ris. |
| T-I | Oven | 7 hrs. | 110 | 295 | ris. |
| T-I | Ethanol | 7 hrs. | 110 | 299 | ris. |

The results show that the starches can be dehydrated by ethanol extraction. The results also show that dehydration without the subsequent heat treatment did not inhibit the starch. The viscosity breakdown was not significantly different from that of the native waxy maize starch. Both of the thermally-inhibited pH 7 starches were higher in viscosity than the pH 5.3 (as is) thermally-inhibited starches. The starches which were thermally-inhibited at pH 9.5 were moderately highly inhibited or highly inhibited (rising curve).

Example 16

Granular tapioca, corn, and waxy rice starches and waxy rice flour were adjusted to pH 9.5, dehydrated in an oven and by extraction with ethanol, and heat treated at 160° C. for the indicated time. They were evaluated for Brabender viscosity using the procedure previously described.

The Brabender results are shown below.

| Starch | Dehydration Method | Heat Treatment Time | Viscosity (BU) Peak | Peak + 10' | Breakdown (%) |
|---|---|---|---|---|---|
| Tapioca (pH 9.5 and 160° C.) | | | | | |
| Dehydrated | oven | — | 745 | 330 | 58 |
| Dehydrated | ethanol | — | 720 | 330 | 54 |
| T-I | oven | 5 hrs. | 270 | 260 | 3 |
| T-I | ethanol | 5 hrs. | 260 | 258 | 1 |
| T-I | oven | 7 hrs. | 110 | 155 | ris. |
| T-I | ethanol | 7 hrs. | 100 | 145 | ris. |
| Corn (pH 9.5 and 160° C.) | | | | | |
| Dehydrated | oven | — | 330 | 280 | 15 |
| Dehydrated | ethanol | — | 290 | 250 | 14 |
| T-I | oven | 5 hrs. | 10 | 80 | ris. |
| T-I | ethanol | 5 hrs. | 10 | 170 | ris. |
| T-I | oven | 7 hrs. | 10 | 65 | ris. |
| T-I | ethanol | 7 hrs. | 10 | 45 | ris. |
| Waxy Rice (pH 9.5 and 160° C.) | | | | | |
| Dehydrated | oven | — | 1200 | 590 | 50.8 |
| Dehydrated | ethanol | — | 1155 | 450 | 61.0 |
| T-I | oven | 5 hrs. | 518 | 640 | ris. |
| T-I | oven | 7 hrs. | 265 | 458 | ris. |
| T-I | ethanol | 7 hrs. | 395 | 520 | ris. |
| Waxy Rice Flour (pH 9.5 and 160° C.) | | | | | |
| Dehydrated | oven | — | 895 | 700 | 22 |
| Dehydrated | ethanol | — | 870 | 410 | 53 |
| T-I | oven | 5 hrs. | 38 | 73 | ris. |
| T-I | ethanol | 5 hrs. | 140 | 260 | ris. |
| T-I | oven | 7 hrs. | 10 | 16 | ris. |
| T-I | ethanol | 7 hrs. | 40 | 100 | ris. |

The results show that pH 9.5-adjusted, ethanol-extracted, heat-treated tapioca and corn starches had viscosity profiles generally similar to those of the same thermally-inhibited starches which were oven-dehydrated. The 7 hours heat-treated samples were more inhibited than the 5 hour heat-treated samples.

Example 17

This example compares ethanol extracted granular waxy maize starches and oven-dehydrated granular waxy maize starches heat treated in an oven for 5 and 7 hours at 160° C. at the same pH, i.e., pH 8.03.

The Brabender results are shown below.

| Dehydration/ Heat Treatment | Viscosity (BU) Peak | Peak + 10' | Breakdown (%) |
|---|---|---|---|
| Oven/None | 1160 | 360 | 69 |
| EtOH/None | 1120 | 370 | 67 |
| Oven/5 hrs. | 510 | 455 | 11 |
| EtOH/5 hrs. | 490 | 445 | 9 |
| Oven/7 hrs. | 430 | 395 | 8 |
| EtOH/7 hrs. | 360 | 330 | 8 |

The thermally-inhibited starches were slurried at 6.6% solids (anhydrous basis), pH adjusted to 6.0–6.5, and then cooked out in a boiling water bath for 20 minutes. The resulting cooks were allowed to cool and then evaluated for viscosity, texture, and color.

| Dehydration Method | Time at 160° C. | Viscosity | Texture | Color |
|---|---|---|---|---|
| Oven | None | heavy to v. heavy | cohesive | sl. off-white |
| Ethanol | None | heavy to v. heavy | cohesive | sl. off-white |

-continued

| Dehydration Method | Time at 160° C. | Viscosity | Texture | Color |
|---|---|---|---|---|
| Oven | 5 hours | mod. heavy to heavy | non-cohesive, smooth | sl. tan, darker* |
| Ethanol | 5 hours | mod. heavy to heavy | non-cohesive, smooth | sl. tan |
| Oven | 7 hours | mod. heavy to heavy | non-cohesive, smooth | mod. tan, darker* |
| Ethanol | 7 hours | mod. heavy to heavy | non-cohesive, smooth | mod. tan |

*Slightly darker than ethanol-dehydrated samples.

These Brabender results show that highly inhibited starches can be obtained by both thermal and non-thermal dehydration. The cook evaluation results show that there is a benefit for the ethanol-dehydrated, thermally-inhibited starches in terms of reduced color. As will be shown hereafter, there is also a flavor improvement with ethanol dehydration.

Example 18

This example shows that alcohol dehydration provides better tasting thermally-inhibited starches.

The test performed was a "Triangle Taste Test" which employs three coded samples, two identical and one different, presented simultaneously. None of the samples is identified as the standard. Control and experimental treatments were systematically varied so that each was presented in odd and identical sample positions an equal number of times. The judge determined which of the three samples differed from the other two. A forced choice was required. Statistical analysis was used to determine whether a significant difference between treatments existed. The probability of choosing the different or odd sample by chance alone was one-third. Once the odd sample was chosen the judges were asked why the samples were different and which they preferred.

The starches tested were waxy maize starches adjusted to pH 9.5 and heat treated for 7 hours at 140° C. but one sample was dehydrated by ethanol extraction and the other sample was thermally dehydrated prior to the thermal inhibition step.

The thermally-inhibited starches were washed by slurring the granular starch with 1.5 parts water, mixing for 10 minutes on a stir plate, vacuum filtering the slurry, and washing the starch cake twice with 50 mls of distilled water. Then sufficient water was added to bring the slurry solids to 3%, the pH was adjusted to 6.0–6.5 and the slurry was cooked 20 minutes in a boiling water bath, cooled to slightly above room temperature, and evaluated.

The judges were given 20 ml samples for tasting. They observed a significant difference between the oven-dehydrated and ethanol-dehydrated starches. Nine out of the twelve judges chose the one different sample. All nine of the judges who could determine the different sample preferred the sample that was ethanol-extracted. Attributes that were used to describe the ethanol-extracted sample included clean, not bitter, and smooth compared to the oven-dehydrated sample.

Example 19

This example shows that an alcohol extraction after a granular starch is thermally-inhibited provides a better tasting starch.

A thermally-inhibited, granular waxy maize (adjusted to pH 9.5 and heat treated for 180 minutes in a fluidized bed at 160° C.) was placed in a Soxhlet extraction apparatus and allowed to reflux overnight (about 17 hrs) using ethanol as the solvent (bp-78° C.). The extracted starch was then laid on paper to allow excess ethanol to flash off. The resulting dry starch was washed by slurring the starch with 1.5 parts water, mixing for 10 minutes on a stir plate, vacuum filtering the slurry, and washing the starch cake twice with 50 ml of distilled water. Then sufficient water was added to bring the slurry solids to 3%, the pH was adjusted to 6.0–6.5, and the slurry was cooked in a boiling water bath for 20 minutes. The cook was cooled to slightly above room temperature and evaluated. The thermally-inhibited, non-ethanol-extracted base was used as the control.

The taste test performed was a "Paired-Preference Test". Two samples are presented, simultaneously or sequentially. The judge is requested to express a preference based on a specific attribute, here which sample is cleaner. Results are obtained in terms of relative frequencies of choice of the two samples as accumulated for all participants. Six of the eight trained judges identified the ethanol-extracted sample as having a blander, cleaner flavor with less aftertaste.

Example 20

The effects of the presence of protein, and heat treating times and temperatures on inhibition on samples of waxy maize containing 3.95%e endogenous protein, adjusted to pH 8.5 and 9.5, and on samples containing 1.52% endogenous protein, adjusted to pH 7.5 and 9.5, were evaluated and the results set out in the following tables. The data show that the presence of protein leads to higher levels of inhibition than are attained in samples without protein. The results also show that the protein level, the pH and the time and the temperature for heat treating all have an independent and a cumulative effect on the level of inhibition, so that inhibition increases as the protein, pH, time, and temperature increase.

| Waxy Maize (3.95% endogenous protein/pH 9.5) | | | | | |
|---|---|---|---|---|---|
| | | Viscosity (BU) | | | |
| | Peak | Peak + 10' | 92° C. | 92° C. + 30' | Breakdown (%) |
| Control | 940 | 400 | | | 57 |
| Temp (° C.) | Time (min) | | | | |
| 125 | 0 | — | — | 660 | 680 | ris. |
| 125 | 30 | — | — | 710 | 750 | ris. |
| 140 | 0 | — | — | 540 | 600 | ris. |
| 160 | 0 | — | — | 350 | 375 | ris. |
| 160 | 30 | — | — | 260 | 295 | ris. |
| 160 | 60 | — | — | 220 | 275 | ris. |
| 160 | 90 | — | — | 180 | 255 | ris. |
| 160 | 100 | — | — | 130 | 200 | ris. |
| 160 | 120 | — | — | 150 | 210 | ris. |
| 160 | 150 | — | — | 150 | 190 | ris. |
| 160 | 180 | — | — | 130 | 180 | ris. |

Waxy Maize (1.52% endogenous protein/pH 9.5)

| | | Viscosity (BU) | | | | |
|---|---|---|---|---|---|---|
| Temp (° C.) | Time (min) | Peak | Peak + 10' | 92° C. | 92° C. + 30' | Breakdown (%) |
| Control | | 1030 | 300 | | | 71 |
| 125 | 0 | 1090 | 540 | — | — | 50 |
| 125 | 15 | 1080 | 650 | — | — | 40 |
| 140 | 0 | 1010 | 840 | — | — | 17 |
| 160 | 30 | — | — | 480 | 575 | ris. |
| 160 | 60 | — | — | 340 | 610 | ris. |
| 160 | 90 | — | — | 255 | 540 | ris. |
| 160 | 120 | — | — | 120 | 340 | ris. |
| 160 | 150 | — | — | 120 | 330 | ris. |

Waxy Maize (3.95% endogenous protein/pH 8.5)

| | | Viscosity (BU) | | | | |
|---|---|---|---|---|---|---|
| Temp (° C.) | Time (min) | Peak | Peak + 10' | 92° C. | 92° C. + 30' | Breakdown (%) |
| Control | | 740 | 235 | | | 68 |
| 125 | 0 | 1005 | 550 | — | — | 45 |
| 125 | 15 | 935 | 700 | — | — | 25 |
| 140 | 0 | 705 | 610 | — | — | 13 |
| 160 | 0 | — | — | 470 | 480 | ris. |
| 160 | 30 | — | — | 380 | 455 | ris. |
| 160 | 60 | — | — | 290 | 430 | ris. |
| 160 | 90 | — | — | 235 | 410 | ris. |
| 160 | 120 | — | — | 210 | 380 | ris. |

Waxy Maize (1.52% endogenous protein/pH 7.6)

| | | Viscosity (BU) | | | | |
|---|---|---|---|---|---|---|
| Temp (° C.) | Time (min) | Peak | Peak + 10' | 92° C. | 92° C. + 30' | Breakdown (%) |
| Control | | 1100 | 240 | | | 78 |
| 125 | 0 | 1230 | 480 | — | — | — |
| 140 | 0 | 950 | 730 | — | — | 23 |
| 140 | 0 | 660 | 570 | — | — | 14 |
| 160 | 30 | 535 | 505 | — | — | 6 |
| 160 | 60 | — | — | 480 | 415 | ris. |
| 160 | 90 | — | — | 490 | 430 | ris. |
| 160 | 120 | — | — | 465 | 435 | ris. |
| 160 | 150 | — | — | 435 | 420 | ris. |

Example 21

This example describes the effect of the removal of various proteins, lipids, and other off flavor components on the flavor (i.e., taste and aroma) of a thermally-inhibited waxy maize.

Prior to the thermal inhibition process (i.e., solvent extraction or freeze drying and heat treatment), the protein is extracted from a waxy maize starch as follows. The starch is slurried at W=1.5 (50 lbs starch to 75 lbs of water) and the pH is adjusted to 3–3.5 with sulfuric acid. Sodium chlorite is added to give 2% on the weight of the starch. The starch is steeped overnight at room temperature. The pH is raised to about 9.5 using a 3% sodium hydroxide solution and washed well prior to drying. The protein level of the starch is reduced to about 0.1%. The protein level of an untreated waxy maize control (pH 9.5) is about 0.3%.

This treatment should improve the flavor of the thermally-inhibited granular starches prepared using the non-thermal dehydration methods since the same treatment of a thermally-inhibited granular starch prepared using thermal dehydration improved the flavor as reported below. Removal of various proteins, lipids, and other off flavor components is expected to improve the flavor of all starch bases and flours.

Using a one-sided, directional difference taste testing procedure, as described in "Sensory Evaluation Techniques" by M. Meilgaard et al., pp. 47–111 (CRC Press Inc., Boca Raton, Fla. 1987), the protein-reduced thermally-inhibited waxy maize (adjusted to pH 9.5; dehydrated and heat treated for 90 min at 160° C. in a fluidized bed) was compared to the thermally-inhibited waxy maize (pH 9.5; 160° C./90 min) which had not been protein-reduced prior to heat treatment.

For the taste test, 3% starch cooks (samples heated at 100° C. for 15 min) were prepared and panelists were asked to select which sample was "cleaner" in flavor. All tests were done in a sensory evaluation room under red lights in order to negate any color differences that may have been present between samples. The results are shown below:

| Trial # | Number of Panelists | Number of Positive Responses[1] | Significance Level (α risk)[2] |
|---|---|---|---|
| 1 | 15 | 12 | 5% |
| 2 | 14 | 11 | 5% |

[1] The number indicated those respondents who selected the protein-reduced product as being cleaner in flavor.
[2] The α values were determined from a statistical table. An α risk of 5% indicates (with 95% confidence) that the samples are statistically different, i.e., that the protein-reduced product is cleaner than the control.

Example 22

A granular waxy maize starch was pH adjusted to pH 9.5 as previously described. The starch was then placed in a freeze dryer and dried for 3 days until it was anhydrous (0% moisture). The freeze-dried (FD) starch was heat treated for 6 and 8 hours at 160° C. in a forced draft oven.

Brabender evaluations were run. The results are shown below:

| Waxy Maize (pH 9.5) | Time at 160° C. | Viscosity (BU) Peak | Peak + 10' | Breakdown (%) |
|---|---|---|---|---|
| Control | — | 1260 | 320 | 75 |
| F.D. | — | 1240 | 320 | 74 |

-continued

| Waxy Maize (pH 9.5) | Time at 160° C. | Viscosity (BU) | | Breakdown (%) |
|---|---|---|---|---|
| | | Peak | Peak + 10' | |
| T-I | 6 hrs. | 340 | 465 | ris. |
| T-I | 8 hrs. | 285 | 325 | ris. |

The results show that the starch can be dehydrated by freeze drying and that the subsequent heat treatment is necessary to inhibit the starch. The starches are highly inhibited as shown by their rising viscosity.

Example 23

This example shows that thermal inhibition reduced the gelatinization temperature of the granular waxy maize starches.

The gelatinization temperature of an untreated waxy maize, a thermally-inhibited (T-I) waxy maize (pH adjusted and not pH adjusted), and chemically-crosslinked (X-linked) waxy maize starches (0.02%, 0.04%, and 0.06% phosphorus oxychloride) were determined by Differential Scanning Calorimetry. The starches were thermally dehydrated and heat treated in an oven for the indicated time and temperature.

The peak gelatinization temperature and enthalpy ($\Delta H$) are shown below.

| Waxy Maize | Peak Gelatinization Temperature (° C.) | Enthalpy (cal/g) |
|---|---|---|
| Unmodified | 74 | 4.3 |
| T-I (pH 9.5; 160° C. for 8.5 hrs.) | 68 | 2.9 |
| T-I Waxy Maize (pH 6; 160° C. for 8 hrs.) | 59 | 2.8 |
| X-linked (0.02% $POCl_3$) | 73 | 4.4 |
| X-linked (0.04% $POCl_3$) | 72 | 4.2 |
| X-linked (0.06% $POCl_3$) | 74 | 4.2 |

The results show that there was a significant reduction in peak gelatinization temperature of the thermally inhibited (T-I) starches. The heat treatment reduced the enthalpy ($\Delta H$) from 4.3 cal/g for the unmodified starch to 2.8–2.9 cal/g for the thermally-inhibited starch. The chemically crosslinked (X-linked) starches are essentially identical to the unmodified waxy starch in peak temperature (72–74° C. vs. 74° C.) and enthalpy (4.2–4.4 vs 4.3 cal/g). The reduced gelatinization temperature suggests that the overall granular structure has been altered by the dehydration and heat treatment.

Example 24

This example shows that the thermal inhibition may begin as early as 110° C. (230° F.), that it is substantially noticeable at 160° C. (320° F.), and that the gelatinization is unchanged or reduced. Granular waxy maize starches were pH adjusted to 7.0 and 9.5 and dehydrated and heat treated using air having a Dew point below 9.4° C. (15° F.) in the fluidized bed previously described at the indicated temperature and time. The Brabender and DSC results are shown below.

| Waxy Maize (pH 7.0) | | | |
|---|---|---|---|
| Dehydration/ Heat Treatment Conditions | Brabender Viscosity (BU) | | |
| | Peak | Peak + 10' | Breakdown (%) |
| Control* | 1010 | 220 | 78.2 |
| 93° C. for 0 min. | 1010 | 220 | 78.2 |
| 116° C. for 0 min. | 1030 | 250 | 75.7 |
| 127° C. for 0 min. | 1050 | 260 | 75.2 |
| 149° C. for 0 min. | 1130 | 350 | 69.0 |
| 160° C. for 0 min. | 1010 | 590 | 41.6 |
| 160° C. for 10 min. | 980 | 630 | 35.7 |
| 160° C. for 20 min. | 910 | 610 | 33.0 |
| 160° C. for 80 min. | 750 | 510 | 32.0 |
| 160° C. for 90 min. | 735 | 510 | 30.6 |

*Not pH-adjusted.

| Dehydration/ Heat Treatment Conditions | Peak Gelatinization Temperature** | Enthalpy** (cal/g) |
|---|---|---|
| Control | 73.07 | 4.43 |
| 93° C. for 0 min. | 71.79 | 4.01 |
| 116° C. for 0 min. | 70.70 | 4.18 |
| 127° C. for 60 min. | 70.66 | 4.07 |
| 149° C. for 90 min. | 70.07 | 3.92 |
| 160° C. for 0 min. | 69.50 | 4.08 |
| 160° C for 10 min. | 71.20 | 4.17 |
| 160° C. for 20 min. | 68.87 | 4.32 |
| 160° C. for 80 min. | 67.84 | 4.35 |
| 160° C. for 90 min. | 67.29 | 4.38 |

*Average of 2 readings.
**Not pH-adjusted.

| Waxy Maize (pH 9.5) | | | |
|---|---|---|---|
| Dehydration/ Heat Treatment Conditions | Brabender Viscosity (BU) | | |
| | Peak | Peak + 10' | Breakdown (%) |
| Control (pH 9.5) | 1240 | 300 | 75.8 |
| 93° C. for 0 min. | 1200 | 300 | 75.0 |
| 104° C. for 0 min. | 1205 | 320 | 73.4 |
| 110° C. for 0 min. | 1260 | 400 | 68.3 |
| 121° C. for 0 min. | 1230 | 430 | 65.0 |
| 127° C. for 0 min. | 1255 | 420 | 66.5 |
| 138° C. for 0 min. | 1245 | 465 | 62.7 |
| 149° C. for 0 min. | 1300 | 490 | 62.3 |
| 160° C. for 0 min. | 1120 | 910 | 18.8 |
| 160° C. for 60 min. | 750 | 730 | 2.7 |
| 160° C. for 90 min. | 690 | 680 | 1.4 |

| Dehydration/ Heat Treatment Conditions | Peak Gelatinization Temperature | Enthalpy (cal/g) |
|---|---|---|
| Control (pH 9.5) | 74.82 | 4.05 |
| 127° C. for 0 min. | 74.84 | 4.17 |
| 160° C. for 0 min. | 73.04 | 4.50 |
| 160° C. for 60 min. | 71.84 | 4.60 |
| 160° C. for 90 min. | 70.86 | 4.26 |

*Average of 2 readings.

The DSC results show that at the onset of inhibition there was a slight reduction in the peak gelatinization temperature and that as the inhibition temperature and time increased there was a reduction in peak gelatinization temperature.

Example 25

This example shows the correlation between the RVA pasting temperature and time and DSC peak gelatinization temperature and time and the reduction in Brabender viscosity breakdown for various granular starch bases and for granular waxy maize starches dehydrated by various methods including heating, ethanol extraction, and freeze drying. The base starches were unmodified. The starches were all adjusted to pH 9.5 before dehydration. The ethanol-extracted and freeze-dried controls were pH adjusted and dehydrated but not heat treated. The dehydrated starches were all heat treated in an oven at 160° C. for the indicated time except for the starches chemically crosslinked with sodium trimetaphosphate (STMP) which were heat treated at 160° C. for the indicated time in the fluidized bed previously described.

The results are shown below.

| Starch | DSC Pasting Temp. (° C.) | DSC Pasting Time (min) | DSC Peak Temp. (° C.) | DSC Peak Time (min) | Viscosity (B. U.) Peak | Viscosity (B. U.) Peak + 10' | Break down (%) |
|---|---|---|---|---|---|---|---|
| Tapioca Control | 68.20 | 3.7 | 70.61 | 6.6 | 1595 | 440 | 72.41 |
| Dehydrated Thermally/Heat Treated at 160° C. | | | | | | | |
| T-I (2 hrs.) | 66.65 | 3.4 | 68.31 | 6.3 | 1230 | 560 | 54.47 |
| T-I (6 hrs.) | 64.20 | 2.9 | 65.41 | 6.0 | 355 | 335 | 5.63 |
| Potato Control | 61.05 | 2.3 | 62.67 | 5.8 | 1825 | 1010 | 44.66 |
| Dehydrated Thermally/Heat Treated at 160° C. | | | | | | | |
| T-I (3 hrs.) | 60.25 | 2.1 | 61.41 | 5.6 | 995 | 810 | 18.59 |
| T-I (6 hrs.) | 60.20 | 2.1 | 61.13 | 5.6 | ris. | ris. | ris. |
| Waxy Maize Control | 70.95 | 4.3 | 73.86 | 6.9 | 1215 | 350 | 71.79 |
| Dehydrated Thermally/Heat Treated at 160° C. | | | | | | | |
| T-I (8 hrs.) | 68.15 | 3.7 | 70.71 | 6.6 | 760 | 720 | 5.26 |
| Waxy Maize Control | 70.95 | 4.3 | 74.23 | 6.9 | 1250 | 400 | 68.00 |
| Ethanol Dehydrated/Heat Treated at 160° C. | | | | | | | |
| T-I (2 hrs.) | 65.00 | 3.1 | 71.81 | 6.7 | ris. | ris. | ris. |
| T-I (7 hrs.) | 63.85 | 2.8 | 68.12 | 6.3 | ris. | ris. | ris. |
| Waxy Maize Control | 71.30 | 4.4 | 74.16 | 6.9 | 1240 | 320 | 74.19 |
| Dehydrated by Freeze Drying/Heat Treated at 160° C. | | | | | | | |
| T-I (6 hrs.) | 69.50 | 4.0 | 66.09 | 6.1 | ris. | ris. | ris. |
| T-I (8 hrs.) | 66.75 | 3.5 | 64.64 | 6.0 | ris. | ris. | ris. |
| Crosslinked Waxy Maize Control | 71.70 | N.D. | 74.33 | 6.9 | ris. | ris. | ris. |
| Thermally Dehydrated Crosslinked Waxy Maize* | | | | | | | |
| T-I (30 min.) | 69.10 | N.D. | 71.66 | 6.7 | ris. | ris. | ris. |
| T-I (150 min.) | 66.00 | N.D. | 67.14 | 6.2 | ris. | ris. | ris. |

*Fluidized bed.

The results show that heat treatment of thermally and non-thermally dehydrated granular starches reduced the pasting and peak gelatinization temperatures while at the same time inhibiting the viscosity breakdown. Because the gelatinization temperature has been lowered by the heat treatment of the dehydrated starch, less time is required to reach the pasting and gelatinization temperatures. The more highly inhibited starches showed a lower pasting temperature and less breakdown in viscosity.

Example 26

This example describes a visual evaluation of the dry powder flow properties of granular waxy maize starches adjusted to pH 9.5 and thermally dehydrated and heat treated in the fluidized bed previously described.

The starches evaluated are shown below:

| No. | Heat Treatment Conditions |
|---|---|
| 1 | 160° C. for 30 min. |
| 2 | 160° C. for 60 min. |
| 3 | 160° C. for 180 min. |

Powder No. 1 distributed fairly evenly and the flow pattern was uniform. It was somewhat fluid and had some dynamic quality. Only a slight amount of air was entrapped in the body of the powder. Powder No. 2 distributed evenly and the flow pattern was uniform. The powder was fluid and had a dynamic quality. There was no air entrapment in the body of the powder. Powder No. 3 distributed evenly and the flow pattern was uniform. The powder was fluid, water-like, and had a dynamic quality. No air was entrapped in the body of the powder. The control starch powder clumped and had an irregular flow. It had a cake-like static quality. Air was entrapped in the body of the powder.

Example 27

This example measures the flow properties of thermally-inhibited waxy maize starches by determining the angle of repose which is an indication of performance with regard to mobility/flow. The starches were adjusted to pH 9.5 and thermally inhibited by dehydration and heat treatment in the fluidized bed previously described.

The results are shown below:

| Heat Treatment Conditions | Angle of Repose * |
|---|---|
| 160° C. for 30 min. | 24.17 |
| 160° C. for 60 min. | 26.75 |
| 160° C. for 180 min. | 23.60 |

* Average of 5 readings.

The thermally-inhibited starches had good flow properties. The control did not flow. A chemically crosslinked and derivatized waxy corn starch also did not flow. The funnels were completely blocked upon addition of the sample. This starch would not even flow through powder funnels with larger internal diameter orifices without constant tapping. Similar results, i.e., no flow, were observed with native corn starch.

Example 28

The following example shows the wet particle size of waxy maize starches adjusted to pH 9.5 and dehydrated and heat treated in the fluidized bed previously described.

| Starch | Heat Treatment Conditions | Wet Particle Size * (microns) |
|---|---|---|
| Control | | 15.198 |
| T-I | 160° C. for 0 min. | 17.029 |
| T-I | 160° C. for 90 min. | 19.251 |
| T-I | 169° C. for 180 min. | 18.880 |

The result shows that the thermally-inhibited starches swell more than the uninhibited control. As the starch became more highly inhibited, the swelling was somewhat reduced but the starch was still more swollen than the control. This increased swelling indicates that the thermally-inhibited starches would be useful as tablet disintegrants.

Example 29

This example shows that the thermally-inhibited starches and flours are substantially sterilized by the dehydration heat treatment in the fluidized bed. This property is useful in all pharmaceutical applications.

The testing was done according to the methods described in The United States Pharmacopeia (USP 23), The National Formulary (NF 18) dated Jan. 1, 1995, which is the procedure described at pages 17–19 of Chapter 3 "Aerobic Plate Count" by J. T. Peeler and L. J. Maturin, F.D.A. Bacteriological Analytical Manual, 7th Edition A.D.A.C. International, Arlington, Va. (1992). The starches were tested for the presence of Coliform, Salmonella, yeast and molds, Staphylococcus aureus, Escherichia coli, and Pseudomonas aeruginosa. The total plate count at 32° C. was determined and any organisms were identified.

PART A—Thermally-Inhibited Waxy Rice Flour

The flour was adjusted to pH 9.5, heat treated under the conditions shown below, and stored for about 3 months in non-sterilized, covered glass containers.

The results are shown below.

| Heat Treatment | Plate Count (CFU) * |
|---|---|
| None | 7500 |
| 160° C. for 0 min. | <10 |
| 160° C. for 60 min. | <10 |
| 160° C. for 120 min. | <10 |

* Colony forming units.

PART B—Thermally-Inhibited Waxy Maize Starch

The starch was adjusted to pH 9.5, and thermally-inhibited under the conditions shown below, and stored for about 2 months in non-sterilized, covered glass containers. The thermally-inhibited starches and the control starch were microbiologically tested for their total plate count and the presence of organisms using the above procedure.

The results are shown below.

| | Plate Count Colony Forming Units (CFU) * |
|---|---|
| None | 2000 |
| 160° C. for 60 min. | <10 |
| 160° C. for 60 min. sample | <10 |
| 160° C. for 120 min. sample) | <10 |

* Colony forming units.

Coliform, Salmonella, yeast and molds, *Staphylococcus aureus, Escherichia Coli,* and *Pseudomonas aeruginosa* were not present. A reading of <10 CFU means there is essentially nothing measurable. The above results are particularly surprising, especially since the thermally-inhibited flours and starches were not handled using aseptic techniques. If stored and maintained under sterile conditions, these starches should be useful in products where microbiological considerations are of concern.

Example 30

Waxy maize samples, crosslinked with phosphorus oxychloride $POCl_3$ at 0.02% by weight, at naturally occurring pH and at pH 9.5 were evaluated for inhibition and the results set out in the following tables. The data show decreasing viscosity and almost no breakdown in viscosity with longer heat treating times, indicating that crosslinked starches can be made even more inhibited by this process. The data also show that increasing the pH further increases inhibition.

Waxy Maize (POCl₃ Natural pH)

| Time (min) | Viscosity (BU) | | | | Breakdown % |
|---|---|---|---|---|---|
| | Peak | Peak + 10' | 92° C. | 92° C. + 30' | |
| Control Temp (160° C.) | 830 | 820 | | | 1 |
| 0 | 750 | 742 | 730 | 720 | 1 |
| 30 | 635 | 522 | 630 | 580 | 2 |
| 60 | 550 | 525 | 550 | 465 | 5 |
| 90 | 425 | 415 | 420 | 360 | 2 |
| 120 | 335 | 315 | 330 | 280 | 6 |
| 150 | 280 | 260 | 280 | 210 | 7 |
| 180 | 205 | 200 | 200 | 180 | 2 |

Waxy Maize (POCl₃ pH 9.5)

| Time (min) | Viscosity (BU) | | | | Breakdown % |
|---|---|---|---|---|---|
| | Peak | Peak + 10' | 92° C. | 92° C. + 30' | |
| Control Temp (160° C.) | 830 | 820 | | | 1 |
| 0 | 750 | 720 | — | — | 4 |
| 30 | — | — | 630 | 660 | ris. |
| 60 | — | — | 400 | 635 | ris. |
| 90 | — | — | 330 | 520 | ris. |
| 120 | — | — | 180 | 530 | ris. |
| 150 | — | — | 110 | 470 | ris. |
| 180 | — | — | 100 | 470 | ris. |

Example 31

This example shows the thermal inhibition of converted starches.

Samples of waxy maize and tapioca starch were slurried in 1.5 parts water. The slurries were placed in a 52° C. water bath, with agitation, and allowed to equilibrate for one hour. Concentrated hydrochloric acid (HCl) was added at 0.8% on the weight of the samples. The samples were allowed to convert at 52° C. for one hour. The pH was then adjusted to 5.5 with sodium carbonate, then to pH 8.5 with sodium hydroxide. The samples were recovered by filtering and air drying (approximately 11% moisture). The starches in 50 g amounts were placed in an aluminum tray, covered and placed into a forced draft oven at 140° C. for 5.5 hours. The starches were evaluated for inhibition.

The results set out in the following table.

| | Waxy Maize Viscosity (BU) | | | Tapioca Viscosity (BU) | | |
|---|---|---|---|---|---|---|
| | Peak | Peak + 10' | Breakdown (%) | Peak | Peak + 10' | Breakdown (%) |
| unmodified | 1380 | 250 | 81.9 | 810 | 225 | 72.2 |
| acid converted | 640 | 110 | 82.3 | 432 | 115 | 73.4 |
| T-I acid converted | 805 | 728 | 9.6 | 495 | 350 | 29.3 |

The results show that converted starches can be thermally inhibited by this process.

Example 32

This example describes the preparation of a thermally-inhibited enzyme-converted starch.

A total of 1.5 kg of a thermally-inhibited waxy maize starch (pH 9.5; heated at 160° C. for 100 minutes in the fluidized bed previously described) is slurried in 4.5 liters of water. The pH of the slurry is then adjusted to 4.5 using dilute hydrochloric acid the temperature of the mixture is then raised to 55° C. and 75 g. of glucoamylase is added. The mixture is stirred until the desired degree of reducing sugar is produced, for example, 23 DE (Dextrose Equivalent), the pH of the mixture is adjusted to 9.5 using dilute sodium hydroxide and held for 30 minutes to inactivate the enzyme. It is then readjusted to pH 6.0–7.0 with dilute hydrochloric acid, recovered by filtration, washing and drying. Alternatively, the reaction mixture can be recovered directly by spray drying without the purification step.

Example 33

Waxy maize samples reacted with 7% and at 3% by weight propylene oxide (PO), at the naturally occurring pH and at pH 9.5, were evaluated for inhibition.

The results set out in the following tables.

| Temp (° C.) | Time (min) | Viscosity (BU) | | | | Breakdown (%) |
|---|---|---|---|---|---|---|
| | | Peak | Peak + 10' | 92° C. | 92° C. + 30' | |
| Waxy Maize (7% PO and natural pH at 160° C.) | | | | | | |
| Control | — | 1420 | 395 | — | — | 72 |
| 160 | 0 | 1030 | 380 | — | — | 63 |
| 160 | 30 | 800 | 530 | — | — | 34 |
| 160 | 60 | 685 | 430 | — | — | 37 |
| 160 | 90 | 635 | 340 | — | — | 46 |
| 160 | 120 | 620 | 340 | — | — | 45 |
| 160 | 150 | 565 | 300 | — | — | 47 |
| 160 | 180 | 540 | 280 | — | — | 48 |
| Waxy Maize (7% PO and pH 9.5 at 160° C.) | | | | | | |
| Control | — | 1420 | 395 | — | — | 72 |
| 160 | 0 | 1360 | 960 | — | — | 29 |
| 160 | 30 | 1010 | 950 | — | — | 6 |
| 160 | 60 | 1030 | 930 | — | — | 10 |
| 160 | 90 | 910 | 890 | — | — | 2 |
| 160 | 120 | 843 | 830 | — | — | 2 |
| 160 | 180 | 800 | 792 | — | — | 1 |
| Waxy Maize (3% PO and natural pH at 160° C.) | | | | | | |
| Control | — | 1155 | 280 | — | — | 76 |
| 160 | 0 | 900 | 360 | — | — | 60 |
| 160 | 30 | 570 | 370 | — | — | 35 |
| 160 | 60 | 480 | 350 | — | — | 27 |

-continued

| | | | Viscosity (BU) | | |
|---|---|---|---|---|---|
| Temp (° C.) | Time (min) | Peak | Peak + 10' | 92° C. | 92° C. + 30' | Breakdown (%) |
| 160 | 90 | 440 | 300 | — | — | 32 |
| 160 | 120 | 375 | 235 | — | — | 37 |
| 160 | 150 | 310 | 185 | — | — | 40 |
| 160 | 180 | 300 | 180 | — | — | 40 |
| Waxy Maize (3% PO and pH 9.5 at 160° C.) | | | | | | |
| Control | — | 1155 | 280 | — | — | 76 |
| 160 | 0 | 1220 | 960 | — | — | 21 |
| 160 | 30 | 1020 | 950 | — | — | 7 |
| 160 | 60 | 880 | 865 | — | — | 2 |
| 160 | 90 | — | — | 750 | 790 | ris. |
| 160 | 120 | — | — | 620 | 780 | ris. |
| 160 | 150 | — | — | 510 | 750 | ris. |
| 160 | 180 | — | — | 400 | 700 | ris. |

The data show that derivatized starches, in this case etherified starches, can be thermally inhibited by this process and that higher inhibition can be achieved at higher pH.

Example 34

A converted hydroxypropylated waxy maize starch (25 WF starch reacted with 2% propylene oxide) was adjusted to pH 9.5 and thermally inhibited using the fluidized bed previously described. Samples were taken at 110° C., 125° C., and 140° C., all for 0 minutes.

The thermally-inhibited starch samples were cooked in tap water at 88–93° C. (190–200° F.) bath temperature for 30–60 minutes to yield solutions having a Brookfield viscosity of approximately 3000 cps. The viscosity stability at room temperature was evaluated. The control was a hydroxy-propylated waxy maize starch which was not thermally-inhibited.

The results are tabulated below.

| | Solution Stability | | | |
|---|---|---|---|---|
| | Control | 110° C. | 125° C. | 140° C. |
| Water Fluidity | 25.0 | 25.5 | 20.6 | 21.8 |
| Solids (%) | 18 | 18 | 18 | 18 |
| Initial Viscosity (cps) | 3160 | 2550 | 2820 | 2800 |
| Viscosity after 24 hours (cps) | 3280 | — | — | 2640 |
| Viscosity after 7 days (cps) | 3020 | 2475 | 2730 | 2810 |
| Viscosity after 8 days (cps) | 3000 | 1980 | 2140 | 2940 |
| Viscosity after 9 days (cps) | 2850 | 1990 | 2230 | 2870 |
| Appearance | clear | clear | clear | yellow |

Example 35

Waxy maize samples at the naturally occurring pH and at pH 8.5, were reacted with 1% by weight acetic anhydride ($Ac_2O$) and thermally-inhibited. The control was the non-thermally-inhibited waxy maize starch acetate.

| | | Viscosity (BU) | | | |
|---|---|---|---|---|---|
| Time (min) | Peak | Peak + 10' | 92° C. | 92° C. + 30' | Breakdown (%) |
| Waxy Maize (1% $Ac_2O$ and natural pH at 160° C.) | | | | | |
| Control | — | 1480 | 490 | — | — | 67 |
| | 0 | 1030 | 570 | — | — | 45 |
| | 30 | 880 | 650 | — | — | 26 |
| | 60 | 720 | 510 | — | — | 29 |
| | 120 | 605 | 490 | — | — | 19 |
| | 180 | 545 | 460 | — | — | 16 |
| Waxy Maize (1% $Ac_2O$ and natural pH at 160° C.) | | | | | |
| Control | — | 1480 | 490 | — | — | 67 |
| | 0 | 1170 | 560 | — | — | 52 |
| | 30 | 970 | 725 | — | — | 25 |
| | 60 | 875 | 600 | — | — | 31 |
| | 120 | 690 | 490 | — | — | 29 |
| | 180 | 585 | 545 | — | — | 7 |

The data show that derivatized starches, in this case esterified starches, can be inhibited to varying degrees and that higher inhibition can be obtained at higher pH.

Example 36

This example shows the preparation of a thermally-inhibited cationic starch.

A granular waxy corn starch (1000 g) was slurried in 1500 cc water, 175 g of 4% sodium hydroxide were added, and the slurry was heated to 40° C. One hundred (100) g of a 50% aqueous solution of 3-chloro-2-hydroxypropyl trimethyl ammonium chloride was added while maintaining the pH at 11.5 by adding 4% sodium hydroxide. The mixture was allowed to react overnight at 40° C. The slurry was adjusted to pH 6.5 with hydrochloric acid, filtered, washed and air dried to about 8–15% moisture. The degree of substition was of 0.04.

A portion of the above cationic starch derivative was chemically crosslinked with 0.01 wt. % of epichlorohydrin at 40° C. for 16 hours, neutralized to pH 6.0, filtered, water washed (2 parts water per part of starch), and air dried to about 8–15% moisture.

A portion of the above chemically-crosslinked, cationic starch was thermally inhibited by adjusting the pH to 9.5 with a 5% solution of sodium carbonate, spray-drying without gelatinization to between 3–15% moisture, and thermally dehydrating and heat treating the cationic, chemically-crosslinked granular starch in the fluidized bed previously described.

The starch samples were slurried at 4–6% solids and cooked in a mini-jet cooker (scaled down jet cooker to simulate a commercial jet cooker) at a temperature of 105–122° C. and an applied back pressure of 5–20 psi using controlled live steam. The mini-jet cooker had a cooking chamber capacity or volume of 5.0 ml. The starch was passed through the cooking chamber at a flow rate of about 130 ml/min with a retention time of about 2.3 seconds.

The samples of starches were tested for Brookfield viscosity at 3% solids at 20 rpm with a No. 5 spindle.

| Brookfield Viscosity (cps) | |
| --- | --- |
| Control | 300 |
| T-I Chemically Crosslinked | 3650 |
| T-I (120° C. for 0 min.) | 440 |
| T-I (125° C. for 15 min.) | 790 |
| T-I (130° C. for 0 min.) | 990 |
| T-I (160° C. for 0 min.) | 1900 |
| T-I (160° C. for 30 min.) | <60 |
| T-I (160° C. for 120 min.) | <60 |

The results show that the thermally-inhibited starches are much lower in viscosity (<60 to 1900 cps) than the thermally-inhibited chemically crosslinked starch (3650 cps.). This is a significant advantage in some end uses.

A Brabender analysis run on the starch which thermally inhibited at 160° C. for 120 minutes. It showed a percentage breakdown of 2%.

Example 37

This example shows the preparation of potato starches modified with an amino-multicarboxylic acid (CEPA) reagent, i.e., 2-chloroethylaminodipropionic acid (hereinafter referred to as CEPA-starches) and their subsequent thermal-inhibition.

Deionized water (150 ml) was added to a liter beaker and heated to 45° C. with an external constant temperature bath. A total of 30 g sodium sulfate (30% on starch) was dissolved in the water followed by the addition of 100 g of the potato starch. A solution of 3% aqueous sodium hydroxide (25 ml) was added slowly with good agitation to minimize starch swelling. A 25% aqueous solution of the CEPA reagent (32 ml) to give an 8% starch treatment (dry basis was added simultaneously with a 3% aqueous sodium hydroxide solution (170 ml). The addition rates used kept the level of caustic high so that pH was about 11.0 to 11.5 during the reaction. The reaction was run at 42–45° C. for 16 hours and then neutralized by adding 3 N hydrochloric acid to adjust pH to about 9.5, followed by stirring for 30 minutes. Overhead stirring was used throughout this reaction. The starch was then filtered and washed twice with 150 ml of water and allowed to air dry. Analysis of the starch for bound nitrogen showed 0.25% N (dry basis).

The pH 9.5 CEPA-starch was heat treated at 100° C., 110° C., 120° C., 130° C., and 140° C. for 0 minutes using the fluidized bed previously described.

Example 38

This example describes the preparation of a barbecue sauce containing a thermally inhibited waxy maize starch at its naturally occurring pH (pH 6), heat treated at 160° C. for 150 minutes (T-I starch). The ingredients in percent by weight are as follows:

| | | |
| --- | --- | --- |
| T-I starch | 2.5% |
| sugar | 3.0 |
| salt | 0.3 |
| paprika | 0.2 |
| chili powder | 0.2 |
| cinnamon | 0.2 |
| ground cloves | 0.2 |
| tomato puree | 47.4 |
| minced onion | 5.3 |

-continued

| | |
| --- | --- |
| Worcestershire sauce | 6.6 |
| water | 26.2 |
| vinegar | 7.9 |
| TOTAL | 100.0 |

The sauce is heated to 85° C., held for 15 minutes, and cooled overnight at room temperature. The sauce will have a smooth, non-cohesive texture.

Now that the preferred embodiments of the invention have been described in detail, various modifications and improvements thereon will become readily apparent to the practitioner. Accordingly, the spirit and scope of the present invention are to be limited only by the appended claims, and not by foregoing specification.

What is claimed is:

1. A process for making a thermally-inhibited, non-pregelatinized granular starch or flour, which comprises the steps of:
   (a) non-thermally dehydrating a non-pregelatinized granular starch or flour to anhydrous or substantially anhydrous;
   (b) heat treating the anhydrous or substantially anhydrous starch or flour at a temperature of about 120° C. to about 180° C. for up to 20 hours; and
   (c) optionally adjusting the pH of the non-pregelatinized granular starch or flour to neutral or greater prior to the non-thermally dehydrating step.

2. The process of claim 1, wherein the non-thermally dehydrating step is carried out by extracting the granular starch or flour with a solvent.

3. The process of claim 2, wherein the solvent is a hydrophilic solvent.

4. The process of claim 3, wherein the hydrophilic solvent forms an azeotrope with water.

5. The process of claim 4, wherein the solvent is an alcohol.

6. The process of claim 1, wherein the non-thermally dehydrating step is carried out by freeze drying the granular starch or flour.

7. The process of claim 1, wherein the heat treating step is carried out for up to about 5 hours.

8. The process of claim 1, wherein the pH in optional step (c) is about 7 to about 9.5.

9. The process of claim 8, wherein the pH is about 8 to about 9.5.

10. The process of claim 1, further comprising the step of extracting the heat-treated starch or flour with an organic solvent to improve the flavor and/or color of the starch or flour.

11. The process of claim 10, wherein the solvent is ethanol.

12. The process of claim 1, further comprising the step of washing the starch or flour with water prior to the dehydrating step and/or after the heat treating step.

13. The process of claim 1, further comprising the step of removing protein and/or lipid from the starch or flour prior to the dehydrating step and/or after the heat treating step.

14. The process of claim 13, wherein a bleaching agent or an alkali is used to remove the protein and/or lipid.

15. The process of claim 14, wherein the bleaching agent is sodium chlorite.

16. The process of claim 1, wherein the granular starch or flour is a cereal, root, tuber, legume, or fruit starch or flour.

17. The process of claim 16, wherein the granular starch is selected from the group consisting of banana, corn, pea, potato, sweet potato, barley, wheat, rice, sago, amaranth, tapioca, sorghum, V.O. hybrid waxy maize, waxy maize, waxy rice, waxy barley, waxy potato, waxy sorghum, and a granular starch or flour containing greater than 40% amylose.

18. The process of claim 16, wherein the starch is a waxy starch, a potato starch, a tapioca star or a rice starch.

19. The process of claim 18, wherein the waxy starch is a waxy maize.

* * * * *